United States Patent [19]

Henderson et al.

[11] Patent Number: 4,530,061
[45] Date of Patent: Jul. 16, 1985

[54] METHOD OF PRODUCING STENCILS

[75] Inventors: Janet M. Henderson, New Brighton; Michael F. Andrews; Daniel A. Houghton, both of Wayzata, all of Minn.

[73] Assignee: Wood-Tics Inc., New Brighton, Minn.

[21] Appl. No.: 434,608

[22] Filed: Oct. 15, 1982

[51] Int. Cl.³ .............................................. G06F 15/46
[52] U.S. Cl. ........................... 364/475; 219/121 LG; 219/121 LN; 364/171; 364/191
[58] Field of Search ........ 364/474, 475, 520, 167–171, 364/191–193; 318/568; 219/121 L, 121 LG, 121 LH, 121 LV, 121 LN

[56] References Cited

U.S. PATENT DOCUMENTS

| 3,668,028 | 6/1972 | Short ........................ 219/121 LP X |
| 3,769,488 | 10/1973 | Hasslinger ................ 219/121 LQ X |
| 4,458,133 | 7/1984 | Macken .................... 219/121 LN X |
| 4,467,168 | 8/1984 | Morgan et al. ............... 219/121 LG |

Primary Examiner—Joseph Ruggiero
Attorney, Agent, or Firm—James V. Harmon

[57] ABSTRACT

An automated method of producing stencils is described in which coordinates of points lying on straight or curved lines are determined and recorded in an electronic storage medium. Sequential points determine circular arcs which are transmitted from storage to a cutter used for producing the stencils.

12 Claims, 29 Drawing Figures

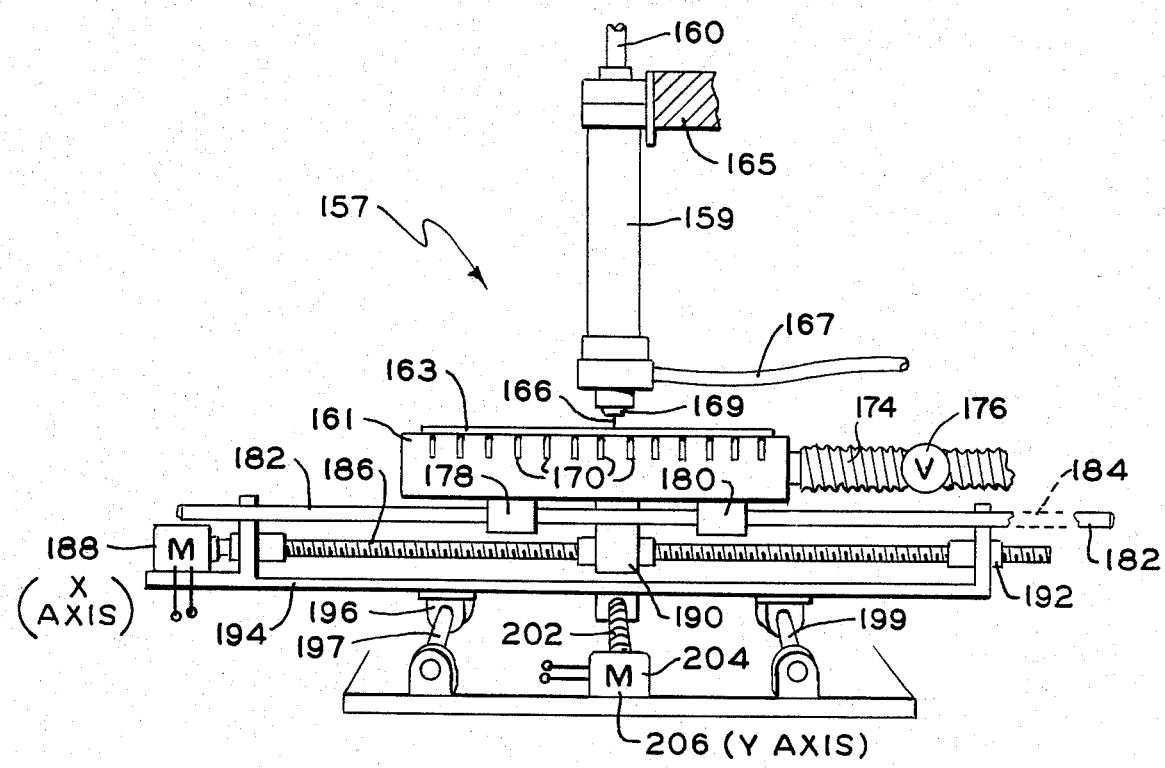
FIG. 8
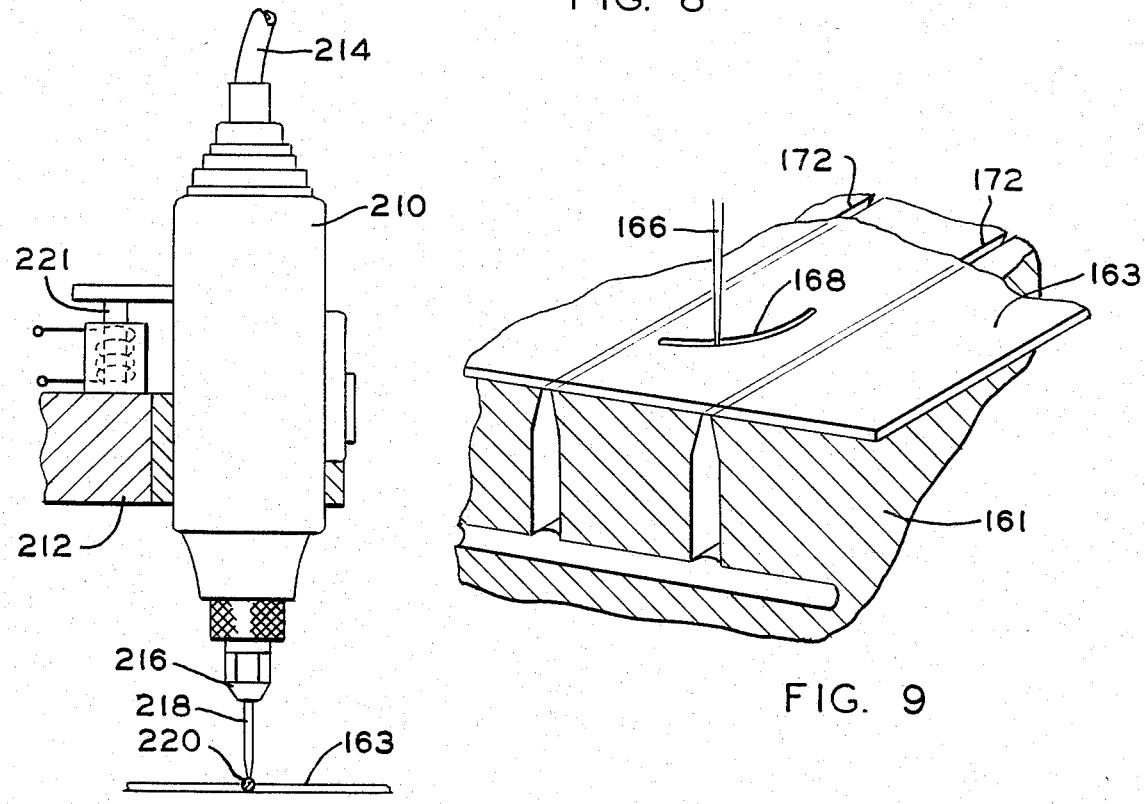
FIG. 9
FIG. 10

| STATEMENT NUMBER | |
|---|---|
| 280 | PRINT "DO YOU WANT TO MIRROR THIS DESIGN" |
| | INPUT (YES OR NO), R$ |
| 290 | R$:Y  ≠ → 380 / = |
| 300 | O$(∅,∅)=STR$(VAL(O$(∅,∅))+1) |
| 310 | O=VAL(O$(∅,∅)) |
| 320 | O$(O,1)="MIRROR" |
| 330 | O$(∅,2)="MIRROR" |
| 340 | PRINT "DO YOU WANT TO PRINT ANY MORE LINES AFTER THE MIRROR" |
| | INPUT (YES OR NO), R$ |
| 350 | R$=Y  ≠ → 380 |
| 360-370 | S$="MIRROR" → 130 |
| 380 | REMEMBER ADJUST COORDINATES SO THERE ARE NO NEGATIVES |
| 390 | X=VAL(O$(∅,∅)) |
| 410 | O$(X,1):MIRROR = → 490 |
| 420 | Y=0 ≠ |
| 430 | O$(X,Y):"32767:32767" = → 480 / ≠ → C |

STATEMENT
NUMBER

Straight Line Drawing Subroutine 1120-1370

STATEMENT
NUMBER (A)

GOSUB 850

280 — NEXT I

290 — T$(0)="A"

300 — T$(1)="/X0000E"
GOSUB 970

310 — T$(1)="/Y00"
GOSUB 970

320 — T$(1)="M2"
GOSUB 970

330 — IF P2 >3 — YES → GOSUB 1020

NO

340 — CLOSE DATA FILES AND CHAIN MASTER MENU (350) — EXTRACT X1, X2, X3, Y1, Y2, Y3 FROM O$(I,0), O$(I,1), O$(I,2) AS X & Y COORDINATES

410 — Y1=Y1*S \ Y2=Y2*S \ Y3=Y3*S

420 — X1>X3 — YES → H1=X1 \ L1=X3

NO

430 — X1<=X3 — YES → H1=X3 \ L1=X1

NO

440 — Y1>Y3 — YES → H2=Y1 \ L2=Y3

NO

450 — Y1<=Y3 — YES → H2=Y3 \ L2=Y1

STATEMENT NUMBER 590
600
610
620
630
640
650
660
665

STATEMENT
NUMBER

780

790

800

810

820

830

840

870

910

920

930

| STATEMENT NUMBER | |
|---|---|
| | (F) |
| 940 | LOAD T$() FOR X POINTS \ GOSUB 970 |
| 950 | LOAD T$() FOR Y POINTS \ GOSUB 970 |
| 960 | GOSUB 1170 \ GOSUB 970 \ RETURN |
| (970) | |
| | LOAD POINTS IN TO P$(1) |
| (1020) | |
| | IF P2 < 203 — YES → RETURN |
| | NO ↓ |
| | DUMP P$(,) ARRAY TO THE PRINTER |
| | RETURN |
| (1160) | |
| 1160 | T$(0)="A" \ T$(1)="M90" \ RETURN |
| (1170) | |
| 1170 | T$(0)="A" \ T$(1)="M91" \ RETURN |
| 1180, 1250, 1320, 1390 | |
| | LOAD T$() FOR X \ GOSUB 970 |
| 1400 | LOAD T$() FOR Y \ GOSUB 970 |
| 1420 | GOSUB 1510 \ GO TO 750 |
| (1460) | |
| 1460 | IF FND(X1,X3,Y1,Y3) < E9 — YES → GO TO 1490 |
| | NO ↓ |
| 1465 | LOAD T$() FOR X \ GOSUB 970 |
| 1470 | LOAD T$() FOR Y \ GOSUB 970 |
| | (G) |

FIG. 13G

METHOD OF PRODUCING STENCILS

FIELD OF THE INVENTION

The present invention relates to automated production processes and more particularly to the automated production of patterns or designs used in stencils or the like.

BACKGROUND OF THE INVENTION

For the purpose of transferring pictures, designs or patterns and, in general, any arrangement of elements that make up the structure of a work of art or craft project, it is often desirable to use a stencil, that is to say, a stiff sheet of material into which grooves or elongated openings have been cut to facilitate transfer of the pattern or design to a sheet of paper or cloth. The pattern present in the stencil is duplicated by placing the point of a pencil or pen in one of the slots or openings in the stencil and tracing each successive one to produce a series of lines on the underlying surface corresponding to the original pattern.

Stencils of this kind were originally produced by hand. While suitable stencils could be made, the process was arduous, time consuming and expensive. The operation was normally performed by placing a sheet of stiff plastic, say 15 mils thick, on the surface of a sheet of glass and then manually cutting elongated openings or slots in the sheet to form a picture, design or pattern. In addition to the slowness and high cost of the process, the slots were wider on one side of the sheet than the other because cutting tools cut a tapered opening.

Automated methods have been proposed for producing patterns and designs but these prior methods have not been entirely satisfactory for mass producing stencils at high speed and at a low cost. In the development of the present invention, an attempt was made to cut patterns in sheet material using a high-speed drill or the beam from a laser by individually measuring by hand the relative location and position of each of the lines to be duplicated and feeding the resulting location numbers into an electronic data storage means suitably coupled to a motor for imparting relative movement between a cutter and a blank stencil to trace out each successive line that was placed in storage. This process was laborious, time consuming and expensive. Most of the expense resulted from the fact that the location, position and curavature of each line had to be carefully determined manually by measuring from reference points. The distances had to then be recorded manually.

It later became clear that what was needed was to find a way to automatically plot the coordinates of points located along the lines to be transferred and then automatically retrieve the stored information rapidly in sequence to cut the design or pattern in the stencil sheet. To do this successfully, it is necessary to be able to work effectively with any picture, art object, design or pattern which may include a large number of straight or curved lines in any position or location and of a variety of lengths with a provision for maintaining small connecting ligaments between adjacent line segments where desired to keep the stencil in one piece even though the pattern may include complete circles and other forms that are closed upon themselves. Another requirement is the necessity for being able to successfully reproduce at high speed patterns including a series of lines that may be of various shapes including portions which are straight or almost straight and other portions curved either to the right or left with various curved sections of different radii. It is also necessary to be able to record and store patterns for any length of time including patterns that are both geometric in shape or otherwise as in the case of pictures of living beings such as animals, human beings or plants as well as scenery or the like.

SUMMARY OF THE INVENTION

In accordance with the present invention, an automated method is provided for producing pictures, designs or patterns in stencils or the like. The patterns are produced in the form of elongated openings, slots or recesses in the stencil material which normally comprises a stiff, semi-flexible sheet of material such as plastic or metal. The finished stencil is produced in an automated method by means of a digital computer having electronic data storage means. First, a graphic representation of the pattern is provided. The lines that are present in the graphing information are represented as straight or curved line segments having their ends touching or spaced apart but adjacent to one another. Each of the curved segments is an arc e.g. of a circle having a selected radius corresponding to the radius of the same curved portion of a line in the original representation of the pattern. Next, each of the curved segments is converted to digital form by defining each of the arcs or lines with three successive points including a beginning point, an ending point and an intermediate point located on the arc between the beginning and ending point. These three points are stored by representing the X and Y coordinates of each point in retrievable form in the electronic data storage means. Thereafter, the stored digital information is converted into digital form adapted to actuate a cutting device such as a high-speed drill, laser or the like to produce lines or slots on a blank stencil sheet. The cutting means is energized to produce the original pattern in the sheet by imparting relative motion between the cutting means and the stencil along each successive arc or line corresponding to the stored digital information defined by the X and Y axes of each of the three points corresponding to each line or arc. The cutter is deenergized at positions located between the adjacent spaced arc segments to define connecting ligaments in the stencil sheet between certain arc segments to thereby produce a pattern of recesses or openings corresponding to the original graphic representation of the pattern.

In one preferred form of the invention, a graphic display means is provided for exhibiting the stored digital information. The stored information is retrieved prior to actual use in cutting a pattern and transferred to the graphic display for visual verification of the graphic representation. If the resulting pattern is not satisfactory, corrections are made before the production operation is started. If it is correct, the data used in the display is placed in permanent storage in electronic data storage memory for later retrieval.

In one convenient system for carrying out the present invention, the following components are used: A manually operable point location digitizer is employed for selecting and recording point by point locations of each of the curved and straight line portions of the pattern or design. A digital computer is connected to the digitizer for integrating and storing the information it receives. Connected to the digital computer is an electronic data storage means or memory. In the preferred form of the invention, a digital line and point plotter is connected to the computer for displaying and verifying designs. Also connected to the computer is a printer for preparing a hard copy of the program for each of the designs. These programs can be stored until needed. Also connected to the digital computer is a stencil cutting device suited for receiving data from the digital computer and then cutting out the stored pattern in the blank stencil. An electronic visual display can also be connected to the digital line and point plotter if desired for quickly exhibiting the design.

In accordance with one preferred form of the invention, the manually operable point location digitizer is moved or traced along each successive line. Three points are selected on each line for recording. A means is provided for determining whether or not the three points recorded define a circle with a relatively small radius or an extremely large radius and in the latter case, when the radius is extremely large, the points are changed to include only the beginning and ending points thereby indicating a straight line.

Also in accordance with the invention, a provision is made for storing only half of a symmetrical design i.e. to its center point so that the mirror image of all points located to one side of the center line is then constructed on the opposite side of the center line without the operator's attention. In this way, a design having bilateral or radial symmetry can be easily produced by entering only half of the points; those points located on one side of the center line.

BRIEF DESCRIPTION OF THE DRAWINGS

Details of the invention and of preferred embodiments thereof will be further understood upon reference to the drawings wherein:

FIG. 8 is a perspective view of a laser cutting apparatus for producing stencils in accordance with the present invention.

FIG. 9 is a partial perspective view of a portion of the stencil as it appears during the cutting operation.

FIG. 10 is a side elevational view of an alternate method of cutting a blank stencil in accordance with the invention.

FIGS. 11A-11D is a schematic block diagram of a program for entering a new design as an example of the invention.

FIGS. 12A-12G is a block diagram of a computer program for plotting a design as an example of the present invention and FIGS. 13A-13H is a schematic block diagram for printing a laser program as an example of the invention.

DESCRIPTION OF THE PREFERRED EMBODIMENTS

In overcoming the deficiencies described in connection with the prior art and to accomplish the foregoing and related ends, the invention is described below by way of example, the following description setting forth in detail certain illustrative embodiments of the invention that indicate however only a few of the variations that can be made in the invention within the scope of the appended claims.

In FIGS. 1-5, a series of diagrams illustrate primarily the approach taken in accordance with the invention and the end result that is achieved when the invention is used in the production of stencils formed from plastic sheet material.

FIGS. 6-10 illustrate how the objectives are accomplished and specifically show examples of electronic and mechanical means for accomplishing the desired results.

FIGS. 11A-13H describe examples of the software used for controlling the automated method of production in accordance with the invention.

Figure 1:
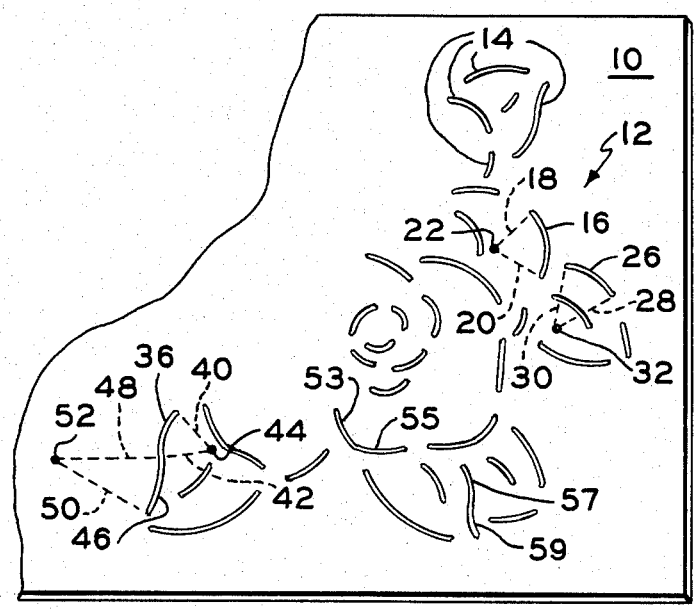
FIG. 1 is a perspective view of a stencil in accordance with the present invention bearing the pattern of a blossom.

Shown in FIG. 1 is a stencil formed from plastic sheet material on the order of 10-15 mils in thickness. The plastic is stiff, semi-flexible and self supporting. It has been designated generally by the numeral 10. Stencil 10 is provided with a design or pattern 12, in this case a blossom which consists of a multiplicity of elongated openings or slots 14, all of which are made up of one or more circular arcs such as 16 having radii 18 and 20 that meet at a center point 22. Others such as arc 26 is similar and includes radii 28 and 30 emanating from the ends thereof and joined at a center point 32, the center of the arc formed by the slot 26. The slot 36, 46 is formed from two circular arcs joined end to end with arc 36 being curved in one direction and arc 46 curved in the opposite direction such that arc 36 has a center point 44 on the right side thereof with radii 40 and 42 while arc 46 has a center point 52 on the left side thereof with radii 48, 50 at its ends. The curved line 55, is made up of two circular arcs joined together at their ends with radii of different lengths located on the same side of the curve. Other slots such as 57, 59 are made up of circular arc segments of different lengths and having center points on opposite sides of the line.

Figure 2:
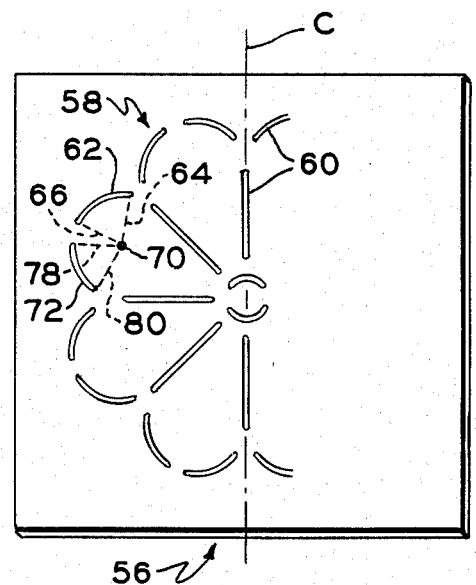
FIG. 2 is a similar view showing a stencil with a different pattern.

Shown in FIG. 2 is another stencil designated 56 which again comprises a rectangular sheet of stiff plastic and includes a design 58, in this case a raidally symmetrical design composed of slots 60. The slots 60 and 14 of FIG. 1 extend all the way through the sheet material and enable the user to trace a design on sheet material placed below the stencil by using a stylus or marker such as a pen or pencil that is placed in each successive opening and drawn from end to the other.

In FIG. 2 it will be seen that the slots 62, 72 have the same center point. Specifically, slot 62 includes radii 64, 66 and slot 72 includes radii 78, 80 extending from its ends all of which join at a center point 70. In this case, the design 58 also includes straight lines which altogether consist of eight slots that extend radially from the center of the design.

Figure 3:
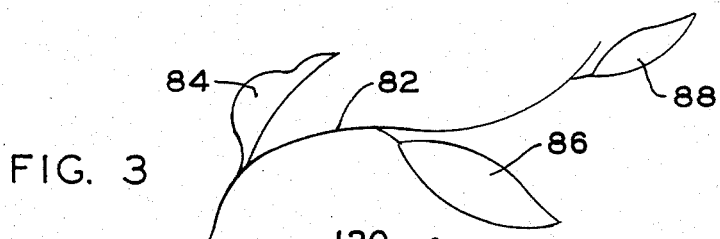
FIG. 3 is a drawing representing the initial or original graphic representation of the pattern to be produced.
Figure 4:
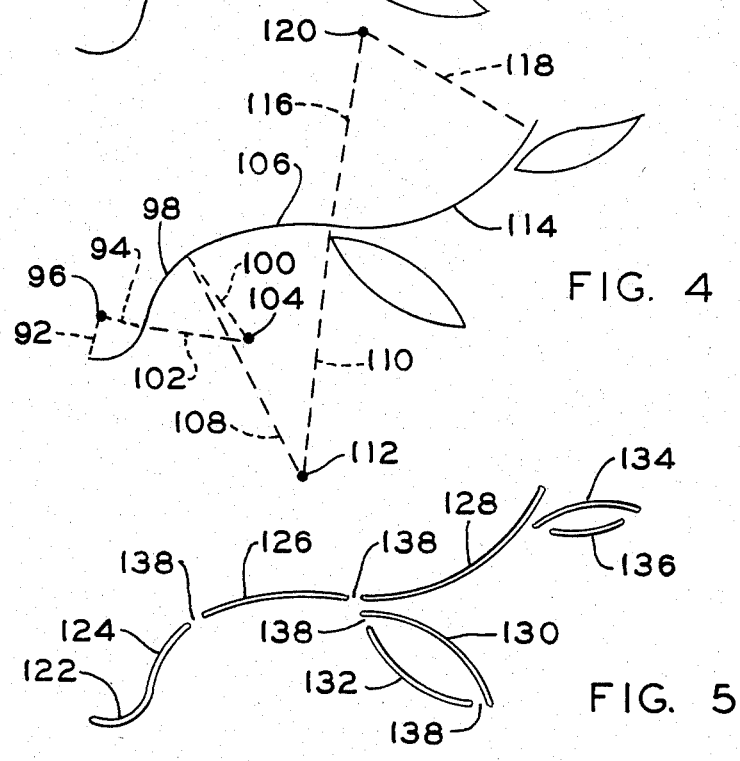
FIG. 4 is a diagram corresponding to FIG. 3 but illustrating the circular arcs constructed and used in accordance with the present invention for reproducing the pattern of FIG. 3.
Figure 5:
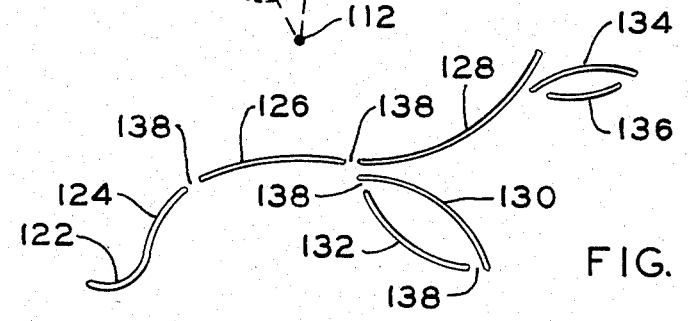
FIG. 5 is a view of the resulting stencil pattern produced from the construction prepared in accordance with FIG. 4.

Refer now to FIGS. 3, 4 and 5 which illustrate successive steps used in preparing a stencil in accordance with the invention. In FIG. 3 is shown a portion of an original picture or drawing, i.e., a graphic representation of the pattern to be produced which in this case consists of a stem 82 with leaves 84, 86, 88. In the first stage of reproducing this design in a stencil, the design is first represented as several arcs e.g. circular arcs or arc segments which may include straight lines as a special condition. Thus, the design of FIG. 3 can be thought of as being composed of a small circular arc 90 at the left with radii 92, 94 which intersect at a center point 96, then proceeding toward the right, a circular arc 98 having radii 100, 102 which intersect at a center point 104, next a circular arc 106 with radii 108, 110 that intersect at a center point 112 and finally, circular arc 114 with radii 116, 118 that converge to a center point 120. Using the method in accordance with the present invention to be described below, a stencil is prepared as shown in FIG. 5. In this case, the stencil includes circular arc segments 122, 124 which are joined at their ends and arc segment 126 which is spaced from arc 124 and arc 128. The end portion of the stem of the plant is represented by a slot 128 composed of a circular arc while two of the leaves are depicted by slots 130, 132 and 134,136. It will be noted that some of the slots are spaced from the ends of adjacent slots to define connecting ligaments 138 between adjacent ends. In this way, the strength of the stencil is maintained and the enclosed portions of the stencil are supported in place.

Figure 6:
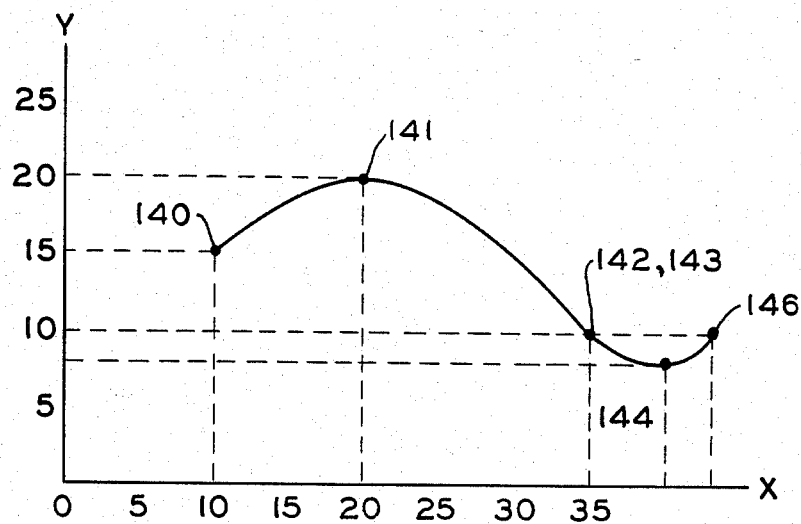
FIG. 6 is a graphic representation of the method used for determining and recording coordinates used in defining lines in accordance with the present invention.

Refer now to FIG. 6 which illustrates with other figures the method used in accordance with the present invention for locating, recording and storing points that are to be used in the pattern carried in the stencil. Shown in FIG. 6 is a curved line having a positive and negative curve proceeding from left to right in the figure. The positively curved portion depicted at the left in the figure is represented by three points 140 and 142 at its ends and 141 at some intermediate location The Cartesian coordinates of each of these three points on X and Y axes is measured and recorded in sequence. This is accomplished by means of a manually operable point location digitizer to be described below. The distance of point 140 from X and Y axes shown in the figure is recorded first. Next, a point 141 positioned anywhere on the curve intermediate the ends is located similarly by recording the distance of point 141 from the X and the Y axes for that point. Finally, the lengths of the X and Y axes is measured and recorded. After this has been done, the digitizer to be described below is used for recording the location of an additional three points, 143 which coincides in this case with point 142, point 144 and point 146 at the opposite end of the negative portion of the curve. Point 144 may be located anywhere along the length of the curve between point 143 and 146. In accordance with the present invention, each of three points along the length of an arc segment is used to define a circular arc when the pattern is to be recreated. While the arc may have shapes other than circular, circular arcs are the simplest and most convenient.

Figure 7:
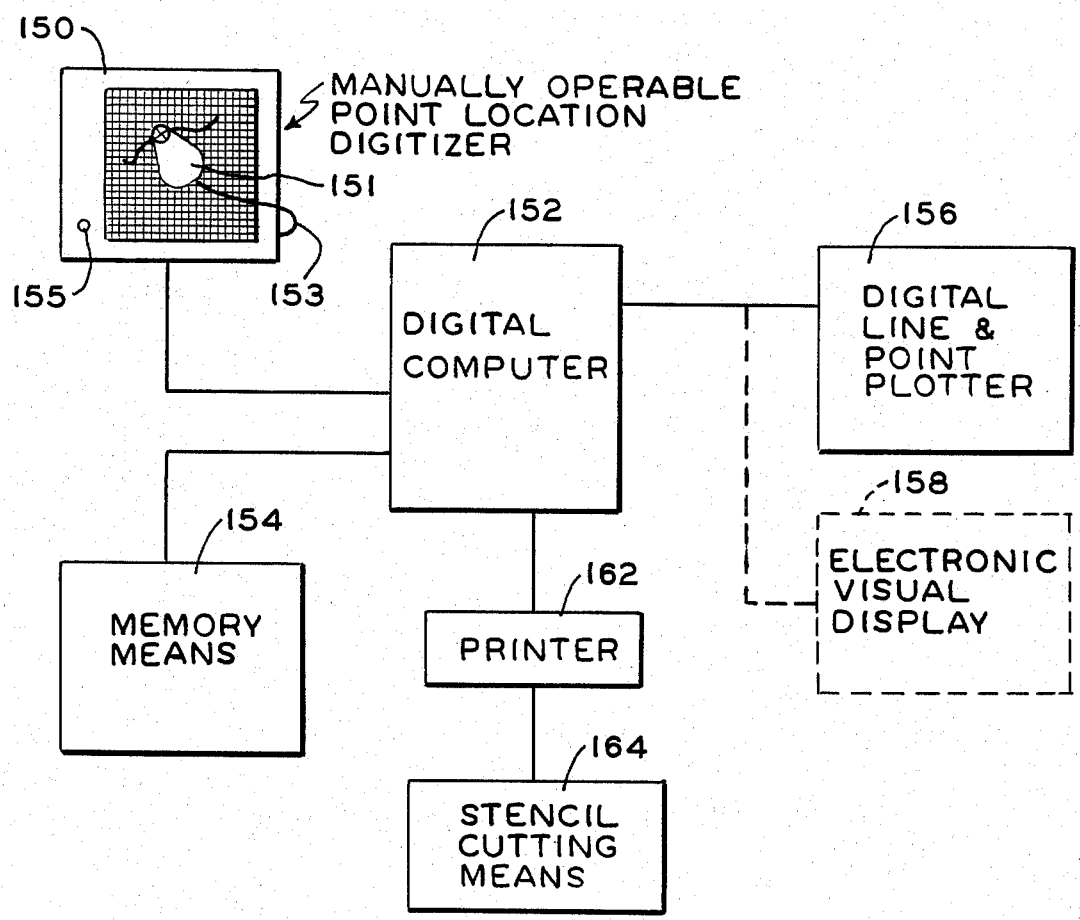
FIG. 7 is a block diagram illustrating an overall arrangement of one example of the circuit that can be used for carrying out the present invention.
Figure 11A:
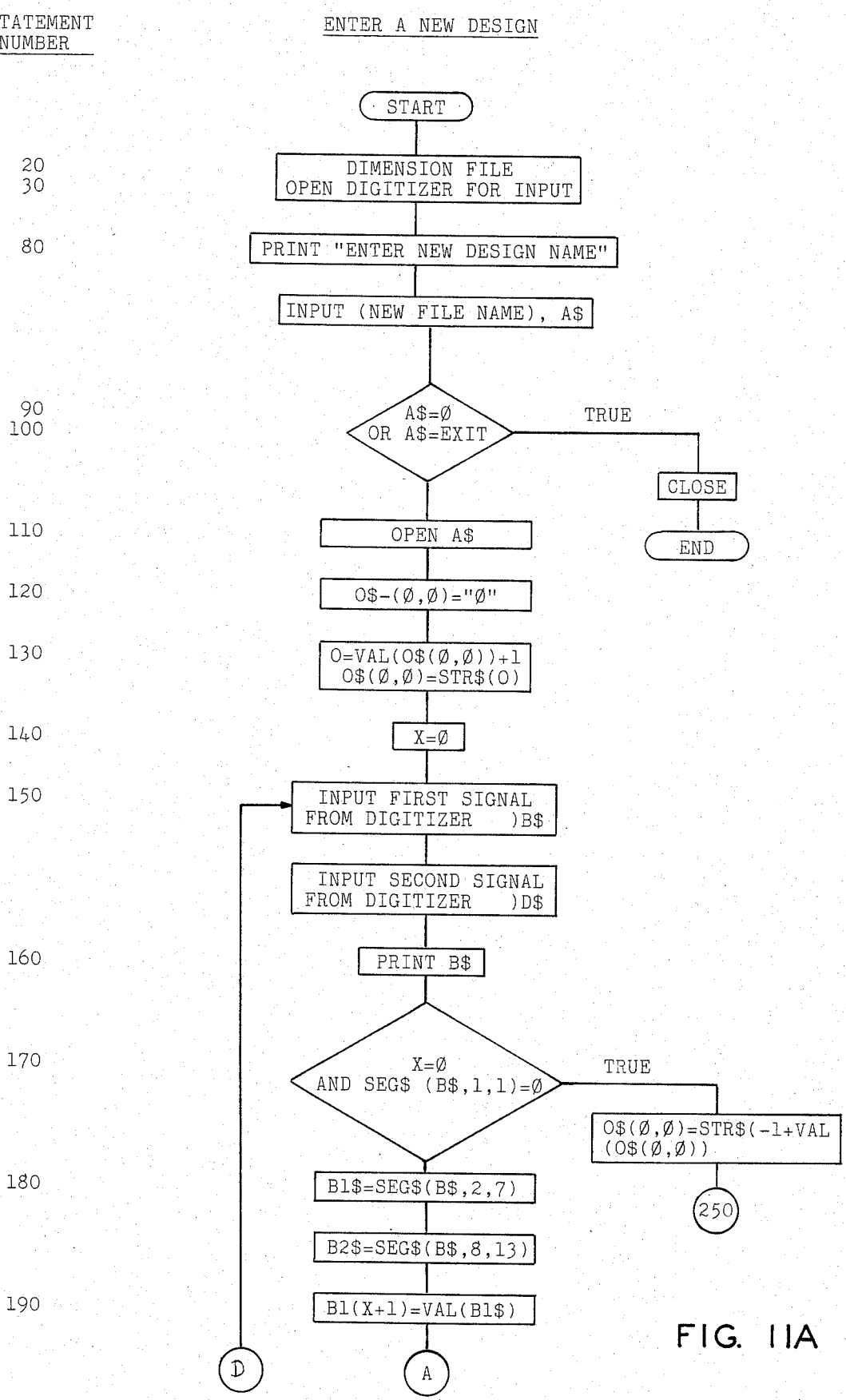
Figure 11B:
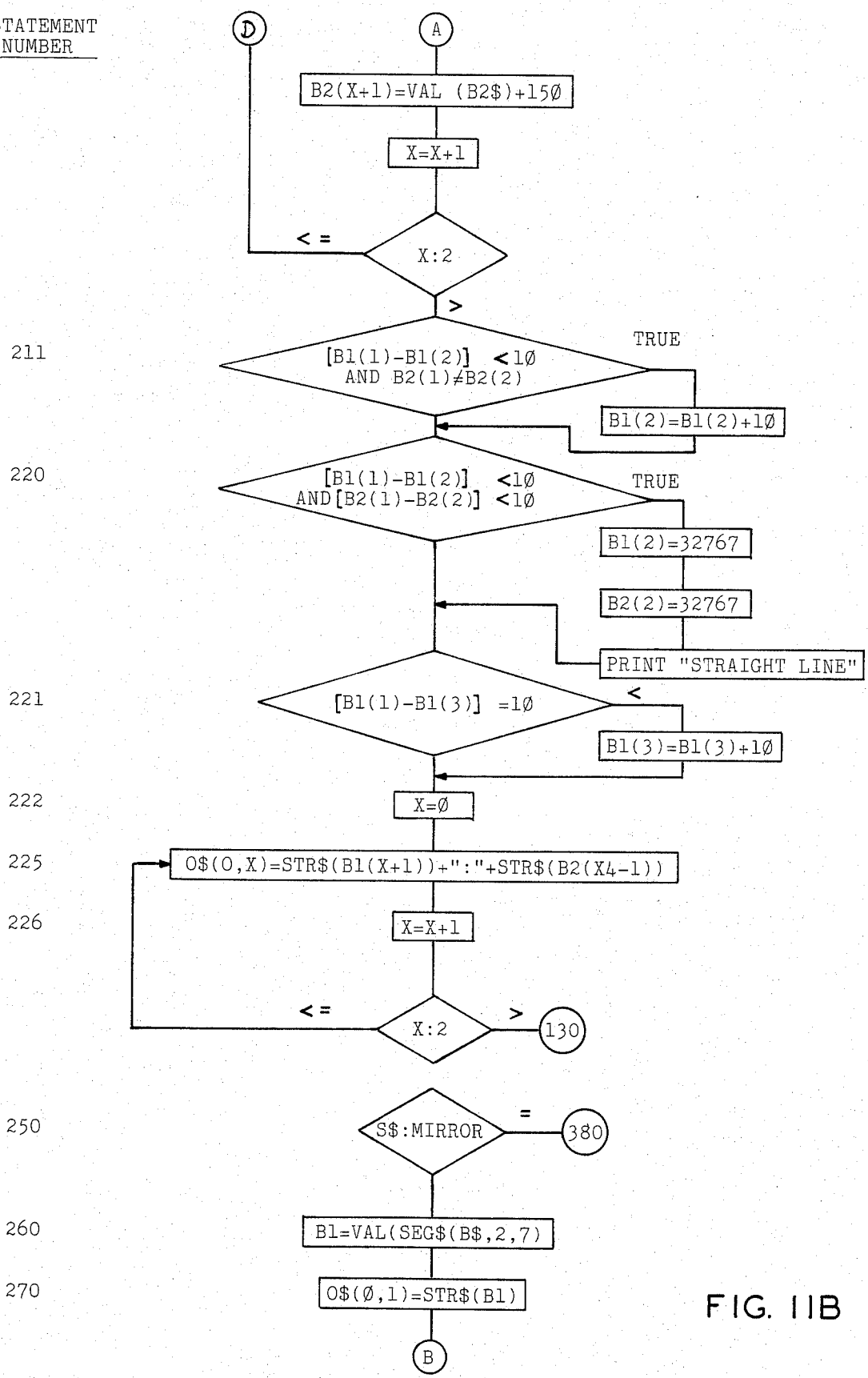
Figure 11D:
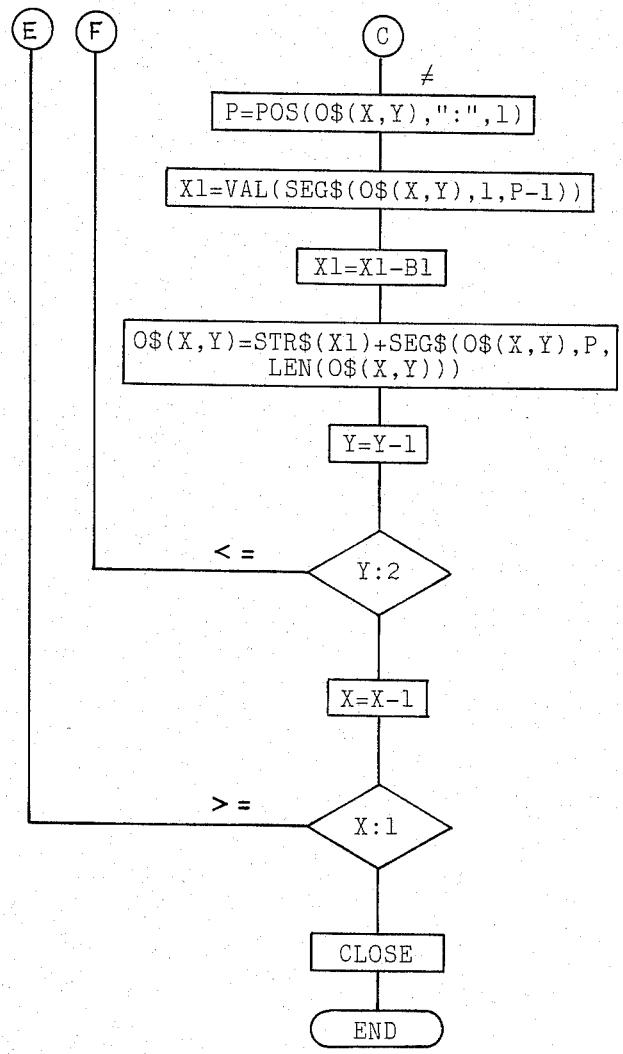

FIG. 7 shows a block diagram of one example of the electronic controls portion of the apparatus embodying the invention, that is, apparatus for recording the data representing a picture or design to be reproduced, storing the information and finally using the information to produce a pattern of elongated openings, slots or recesses within a blank stencil.

To begin the operation, a graphic representation, i.e., a picture of the pattern to be produced, is provided. This picture is placed on the operating surface or grid of a manually operable point location digitizer 150 including a manually movable cursor 151 connected to it by means of a conductor 153. The digitizer is available commercially from more than one manufacturer and by itself forms no part of the present invention. Any suitable digitizer may be used. The digitizer includes a wire grid composed of a multiplicity of vertical and horizontal conductors behind the panel upon which the original design is placed. The cursor 151 includes conductors which form an electrical interaction with those in the grid to thereby designate the Cartesian coordinates of the cursor when the operator closes the switch 155. In operation, after the graphic representation of the pattern to be produced is placed on the digitizer, provision can be made for locating the point of intersection of the coordinate axes from which all points are measured. The cursor 151 is then placed in turn on successive points in the design proceeding from one end of each curve to the opposite end with one intermediate point chosen anywhere between the two. Each time a point is to be located and its coordinates recorded, the switch 155 is closed. The digitizer may also include provision for resetting by clearing all functions, in other words, clearing and location of the original coordinates, clearing any optional visual display that may be used. In this way the coordinates for each successive point are determined and transmitted to a digital computer to be described below. While any suitable digitizer can be used, good results can be obtained with a Hi Pad digitizer manufactured by Houston Instrument Graphics Division of Bausch and Lomb, Inc., Austin, Tex. It will thus be seen that each curved segment of a line is represented by three points rather than by a continuous chain of points which if it were used would require a complex system of curve fitting. In a preferred form of the invention, to enter curved lines, the operator identifies and selects each successive curved portion thereof which is the arc of a circle and at any given point where the curved line departs from the arc of the circle already selected, a new circular arc is started. Thus, it will be seen by referring again to FIG. 6 that when point 142 is reached, a new circular arc composed of points 143, 144 and 146 is started. This is accomplished simply by closing the switch 155 twice at point 142 thereby designating the start of a new arc. If arc 143 is, on the other hand, spaced slightly from point 142, a connecting ligament 138 will be formed between the two adjacent arc segments.

The data from the digitizer is suplied to a digital computer 152 which can be of any suitable type compatible with other circuit components. One suitable computer is a 16 bit microprocessor containing 64K of RAM memory and having four serial communication ports. The computer 152 is connected to a permanent memory 154. The memory 154 is a magnetic memory for off-line permanent storage. One suitable memory is a disc drive such as a 64K byte MOS memory. A commercially available memory of this type that has performed satisfactorily is a Micro I model memory with an MFV11 interface module and an LSI-11|03 central processor manufactured by Plessey Peripheral Systems, Irvine, Calif. The computer is provided with a DLV11J* communication board, 4RS232* ports and a disc controller.

*DLVLLJ and 4RS232 are board and port designations for a PDP1103 computer manufactured by Digital Equipment Corporation, Maynard, Mass.

Connected to receive data from the computer 152 is a digital line and point plotter 156 that is used for driving a pen adapted to reproduce the stored information representing the original design. In operation, the digital plotter is fed a series of pulses from the digital computer 152. The plotting surface of the plotter is identified by three axes, the X and Y axes on the paper and the Z axis which corresponds to raising and lowering the pen used to mark the paper used in the plotter. The input signal from the computer 152 are generated in positive and negative directions which correspond with movement of the pen on the X and Y axes. During operation, the pen will move incrementally in accordance with the pulses from the computer 152 to retrace the arc by making a series of microscopic approximations corresponding to the circular arcs in storage. In this way, by actuating the plotter, the operator can check to make sure that the data in storage is correct and that nothing further has to be added to the design. The operation of the plotter and its interaction with the computer 152 is controlled by the program PLOT A DESIGN to be described more fully below in connection with FIGS. 12A-12G.

Connected to the digital computer if desired is an optional electronic visual display such as a cathode ray tube display 158. This will display the same design or picture that appears on the plotter. While numerous displays are suitable, one that can be used is a DEC cathode ray tube model VT125. This will enable the operator to check the stored information to determine whether or not it is correct and to make additions as required.

After a program has been prepared for a particular design, the program is printed on any suitable electronic printer compatible with the computer 152. The printer 162 thus serves to provide a hard copy of the program for each of the designs that is to be reproduced. The program is then ready for forwarding to the stencil cutting means 164 which will be described in connection with FIGS. 8, 9 and 10. Any of several compatible printers may be used. One suitable printer is a receive-only forms-programmable impact printer. A microprocessor system which controls all character recognition, printing and paper movement is provided. Good results can be obtained with a Texas Instruments Omni 800 Model 810 printer. Basic operating, data processing and self-test routines with a microprocessor system are stored in read-only memory. Random access memory stores vertical format control routines which may be locally programmed by the operator or remotely programmed through the communications line from the computer 152. The cutter means includes any suitable computer numerical control or CNC, a digital computer designed specifically to take programming commands and to keep track of the relative position between a cutting means and a work piece. One suitable CNC is the Bandit model CNC manufactured by the Dana Corporation, Summit Division, of Bozeman, Mont. Another suitable CNC that can be adapted for use is manufactured by Allen Bradley, Inc. of Milwaukee, Wis.

Refer now to FIGS. 8, 9 and 10 which illustrate the mechanical apparatus for automated production of the stencils. As seen in FIG. 8, a stencil cutting apparatus 157 is described including a vertically disposed laser 159 such as a 500 watt $CO_2$ gas laser which is used for cutting the slots in the stencil sheets 163 resting on a supporting table 161. The gas laser 159 is supported in a stationary position by means of a supporting arm 165 only a portion of which is shown. During operation, a laser beam is introduced through an inlet tube 160. The lens of the laser is kept clean by means of an air blast supplied through a supply pipe 167. To begin cutting, a laser beam 166 which is focused to point in the plane of the stencil 163 emanates from the lower end 169 of the laser 159 thereby cutting openings or slots 168 in the stencil (FIG. 9). The stencil sheets 163 are supported and held in place by means of slotted plates 170 having open slots 172 at their upward coplanar, parallel ends to provide a supporting surface. A vacuum is provided in each of the slots by connecting the interior of each of the hollow plates 170 by means of a duct 174 with a vacuum pump 176 shown diagrammatically in FIG. 8. In this way the stencils are held in place during operation against the upper edges of the plates 170. The plates 170 are supported by means of downwardly extending bearings 178, 180 and a similar pair behind those illustrated all four of which are slidably mounted on parallel rods 182, 184 for movement to the right or left during operation by the provision of a rotatable screw 186 driven by means of a positioning or servo motor 188 to drive the platform and stencil to the left or right on the X axis. The ends of the rods 182, 184 are supported on a carriage 194 which is provided with similar downwardly extending bearings supported on parallel rods 197, 199 that are in turn stationarily supported at their ends. In this way the carriage 194 can be moved toward or away from the observer in FIG. 8 along a Y axis by the provision of an electric servo or drive motor 204 coupled via screw 202 with a threaded block 200 connected rigidly to the carriage 194. In this way when the electric motor 204 or servo is actuated, the screw 202 will rotate thereby moving the carriage and stencil 194 either toward or away from the observer in the figure along the Y axis. Both motors 188 and 204 are energized usually simultaneously to enable the laser beam 166 to produce slots that are cut therein as a result of the heat generated by the laser to reproduce the patterns in the original design.

In FIG. 10 is shown another means for cutting the slots 168. In FIG. 10 a high-speed electric drill 210 is provided. The drill 210 is supported rigidly from an arm or framework 212 in a stationary position with current provided through a line 214. At the lower end of the drill is a chuck 216 into which a drill bit such as a number 8 dental bur having a rounded end is supported. The bit, it can be seen, is in a vertical position with the cutting end in engagement with the stencil 156 to thereby cut slots as required along curved or straight lines as the table 154 moves along X and Y axes controlled by the operation of the motors 188, 204. Between slots the laser 152 is turned off or motor 210 raised away from the stencil as the case may be. Raising and lowering the drill 210 can be accomplished by means of a solenoid 221.

To control the operation, a computer program is employed which is composed of three separate programs, the first ENTER A NEW DESIGN, FIGS. 11A-11D, is employed for setting up the locations on the disc memory 154 where points will be stored and priming the location for use as well as for allowing the space to be accessed. This may be referred to as "opening the file."

The second program, FIG. 12A–FIG. 12G, PLOT A DESIGN, is used for checking or verifying the stored information by tracing out or otherwise displaying the stored information for visual inspection. Corrections and additions can then be made as necessary.

The third program entitled PRINT A LASER PROGRAM, FIGS. 13A–13H, is used for converting the stored digital information by reprocessing the information to convert it to a format that can be accepted by the controller for operating the laser 152 and the motors 188 and 204 to move the cutting head (the laser) along X and Y axes for each successive arc in the pattern.

Refer now to FIG. 11 which sets forth the schematic block diagram of the ENTER A NEW DESIGN program. The program employs the following files, arrays and variables which will now be defined.

ENTER A NEW DESIGN

Files and Arrays

B1(3)=A temporary array to store the three X coordinates that define a line.
B2(3)=A temporary array to store the three Y coordinates that define a line.
O$(2000,2)=File used to store the X and Y coordinates of the lines of a pattern.
  The row (2000) represents the lines.
  The column (2) represents the three points of a line.
  Column 0 is the first point of the line format X:Y.
  Column 1 is the second point of the line format X:Y.
  Column 2 is the third point of the line format X:Y.
  Row 0, Column 0 contains the number representing the quantity of lines in this pattern.

Variables

A$=The pattern name. 6 characters.
O=Pointer to the next line available in the file.
B$=X and Y coordinate of a point as input from the digitizer.
D$=Dummy input from the digitizer.
X=Loop counter.
Y=Loop counter.
S$=Switch indicating whether to mirror the design or not.
B1=X coordinate to mirror design across.
R$=Input variable to prompted questions.
P=Position of the ":" in a point stored in the O$(2000,2) file.

A brief summary of the program will now be presented. The numbers on the left below correspond to the line numbers in the complete example of the program of FIG. 11 which can be best understood by reference to the following table and to the definition of terms set forth above.

| Lines | Summary |
| --- | --- |
| 10–120 | Dimension files, initialize files, open files. |
| 130–210 | Input 3 points for a line. |
| 220 | Edit points so that no arc has a radius close to infinity. |
| 221–229 | Load three points into data file. Repeat lines 130–229 as often as necessary to complete the design. |
| 250–330 | Determine if the pattern needs to be mirrored. |
| 340–370 | Determine if the pattern requires more lines after the mirrored portion. |
| 380–490 | Adjust X coordinates of the points of all lines so that the mirror portion does not go negative. |
| 500–520 | Close files and exit program. |

The method of operation of the program will now be described in more detail. In lines 10–120, the object is to set up locations on the disc memory 154 where points are to be stored and to prime that location for storage as well as allowing the space to be accessed. This is commonly referred to as "opening a file." The design on the original drawing is now ready to be traced on the digitizer. In this process, the operator selects three points on each arc in succession beginning with the starting point followed by an intermediate point and finally the end point of each arc by moving the cursor of the digitizer 150 to each successive point and actuating switch 155 thereby forwarding the X and Y axes data to the computer 152 internal memory. At line 220 is described the operation used for determining whether the three points recorded define a circle having an extremely large radius. Radii over 40″ are considered straight lines. If so, the points are changed so that a straight line is indicated, i.e., so that the stored information designates the straight line by recording only its beginning point and its ending point with an arbitrary symbol used to designate that it is a straight line. Following line 221, the three point designation is transferred to the permanent memory, i.e., the data file. Lines 130–229 comprise a loop which is repeated as many times as necessary to complete the entire design.

Beginning on line 250, a step saving operation is carried out. In this operation, the operator is asked if the design is to be mirrored, that is to say, a mirror image provided beginning at a center line such as a line C passing through the center of the design shown in FIG. 2. This can be done if the design has bilateral or radial symmetry in which case the operator merely enters one-half of the design and the other half of the design is mirrored by establishing the same values equidistant from the center line but on the opposite side thereof from the points already entered. The operator answers "yes" or "no" to the question of whether or not the half of the design is to be mirrored. In lines 280–290, assuming the design is to be mirrored, a flag is placed in the data file to repeat all of the points described above as a mirror image on the opposite side of a center line C.

Beginning on line 340, the program is provided with a question asking whether the operator wishes to enter any additional lines. If so, the loop of lines 130–229 is repeated until the design is finished.

In lines 380–490, an adjustment is made in the points that have been entered so that all the coordinates are of a positive or plus sign (minus signs are eliminated). This includes the mirror image. This is accomplished by checking the distance of the furthest point from the center or mirror line C of FIG. 2 and then adding a given increment to all of the numbers so that the negative numbers are eliminated. This will eliminate negative numbers on both sides of the center line C.

Refer now to FIGS. 12A–12G with reference to the program used to PLOT A DESIGN on the digital line and point plotter 156. The general object is to graphically represent the points that were found and recorded in the prior program. The design thus plotted out can be checked for accuracy and completeness. The schematic diagram of FIG. 12 can be better understood by reference to the following definition of terms and to the Summary presented following the tabulation of the terms.

PLOT A DESIGN

Variables

A$=Name of the pattern. 6 characters.
I1=Accurace to use in plotting the pattern.
S=Scale to use in plotting the pattern.
C=Conversion factor to translate X, Y coordinates from the file to the plotter.
S3$=Switch to determine if pen on plotter is up or down.
A1$=Switch to determine plotting backwards or forwards.
I7=Increment loop through file by this value.
I8=Begin loop through file at this value.
I9=End loop through file at this value.
I=Loop counter.
X1=X coordinate of first point in line.
X2=X coordinate of second point in line.
X3=X coordinate of third point in line.
Y1=Y coordinate of first point in line.
Y2=Y coordinate of second point in line.
Y3=Y coordinate of third point in line.
C1, C2, C3=Variables used to define the curve that an arc belongs to.
M=Slope of line between first point and third point of arc.
R=Radius of curve arc belongs to.
S1$, S2$=Switch to check if arc is below line between the two ends.
L1=Low X coordinate of arc.
H1=High X coordinate of arc.
L2=Low Y coordinate of arc.
H2=High Y coordinate of arc.
X=Loop counter.
Y=Loop counter.
C7=Largest X coordinate in pattern.
S4=Switch to see if we mirror this pattern.

| Functions | |
|---|---|
| FNS$(X,Y) = | ";:A" + STR$(INT(X+.5))= ","+STR$(INT(Y+.5)) |
| 0$(2000,2) = | File used to store the X & Y coordinates of the lines of a pattern. The rows (2000) represents the lines. The columns (2) represents the three points of a line. Column ∅ is the first point of the line format X:Y. Column 1 is the second point of the line format X:Y. Column 2 is the third point of the line format X:Y. Row ∅, Column ∅ contains the number representing the quantity of lines in this pattern. |

| Lines | Summary |
|---|---|
| 10-140 | Dimension, open files, enter accuracy and scale, initialize plotter, determine direction to go through data file. |
| 160-200 | Main loop through data file. |
| 210-360 | For the current arc define the circle it belongs to, and the slope between the end points of the arc. |
| 510-580 | Determine high and low coordinates of the arc. |
| 590-598 | Determine which arc point routine to use. |
| 640-750 | Print arc that crosses the X coordinate of the center of the circle at a point greater than the Y coordinate of the center. |
| 760-870 | Print arc that crosses the Y coordinate of center of circle at a point greater than the X coordinate of the center. |

| -continued | |
|---|---|
| 880-990 | Print arc that crosses the X coordinate of center of circle at a point less than the Y coordinate of the center. |
| 1000-1110 | Print arc that crosses the Y coordinate of center of circle at a point less than the X coordinate of the center. |
| 1220-1250 | Print a straight line. |
| 1260 | Define FNS$(X,Y) |
| 1270-1370 | Determine largest X coordinate. |
| 1380-1460 | Print mirrored portion of pattern. |
| 25000-25090 | Error handling routine. |

Figure 12A:
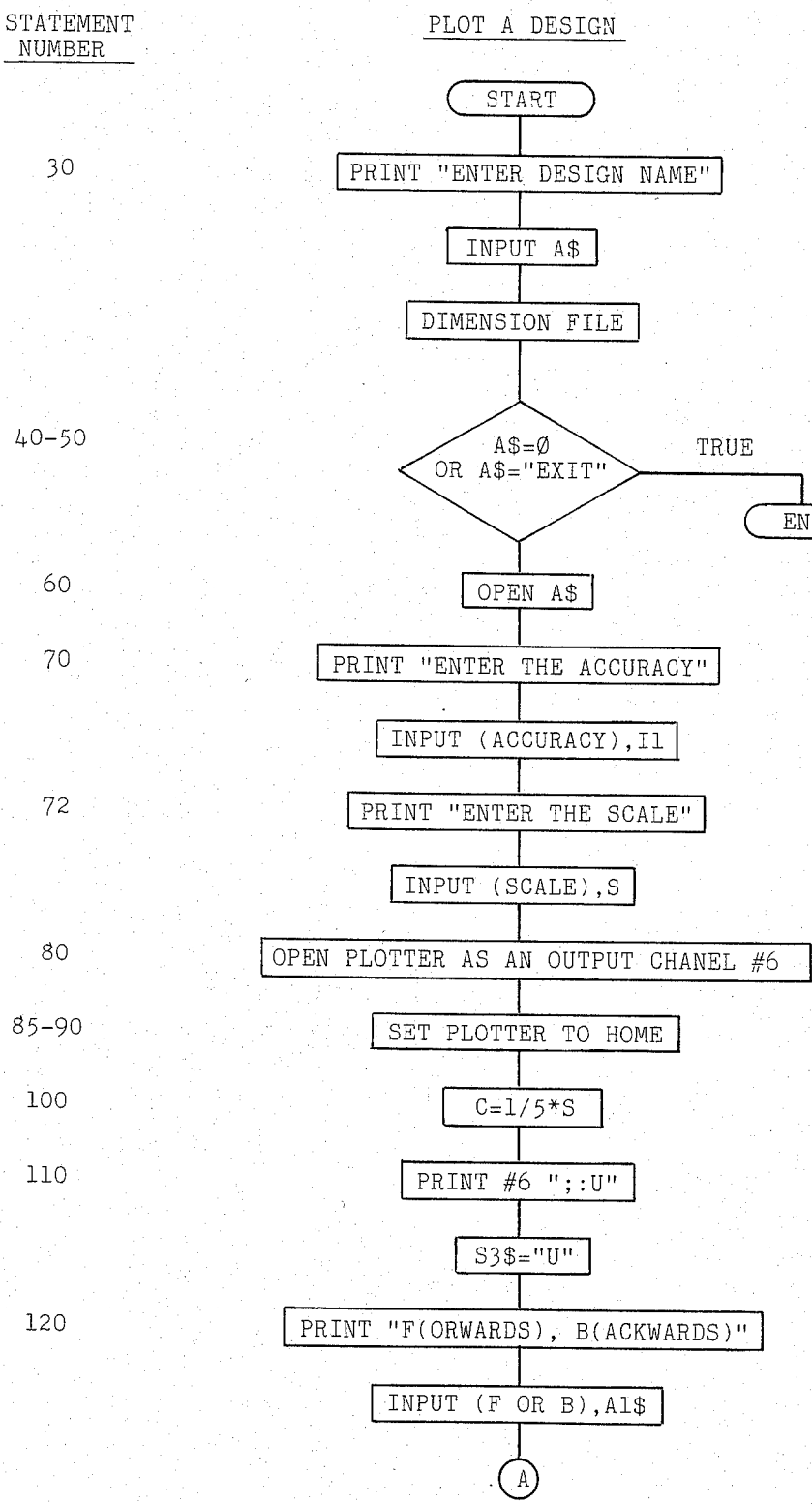
Figure 12B:
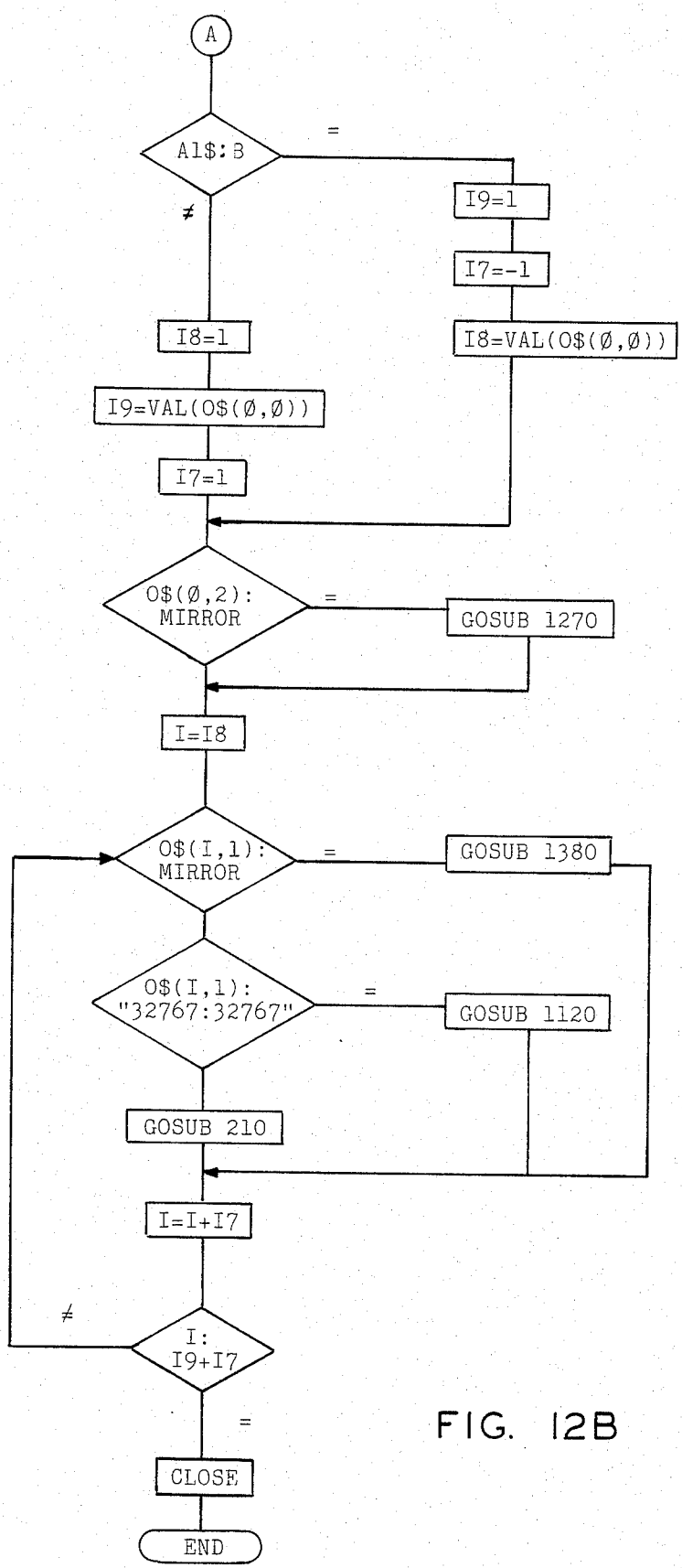
Figure 12C:
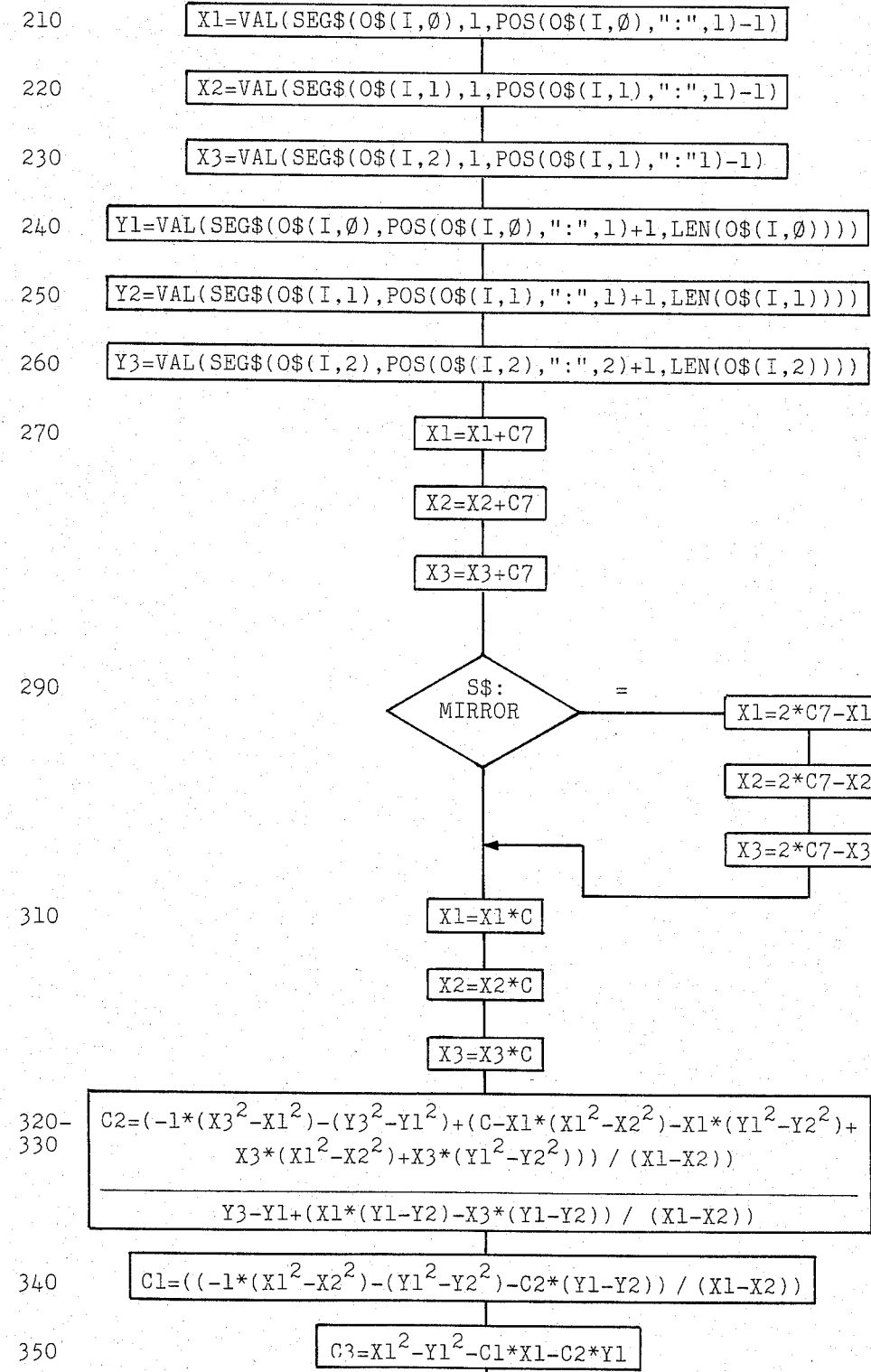
Figure 12D:
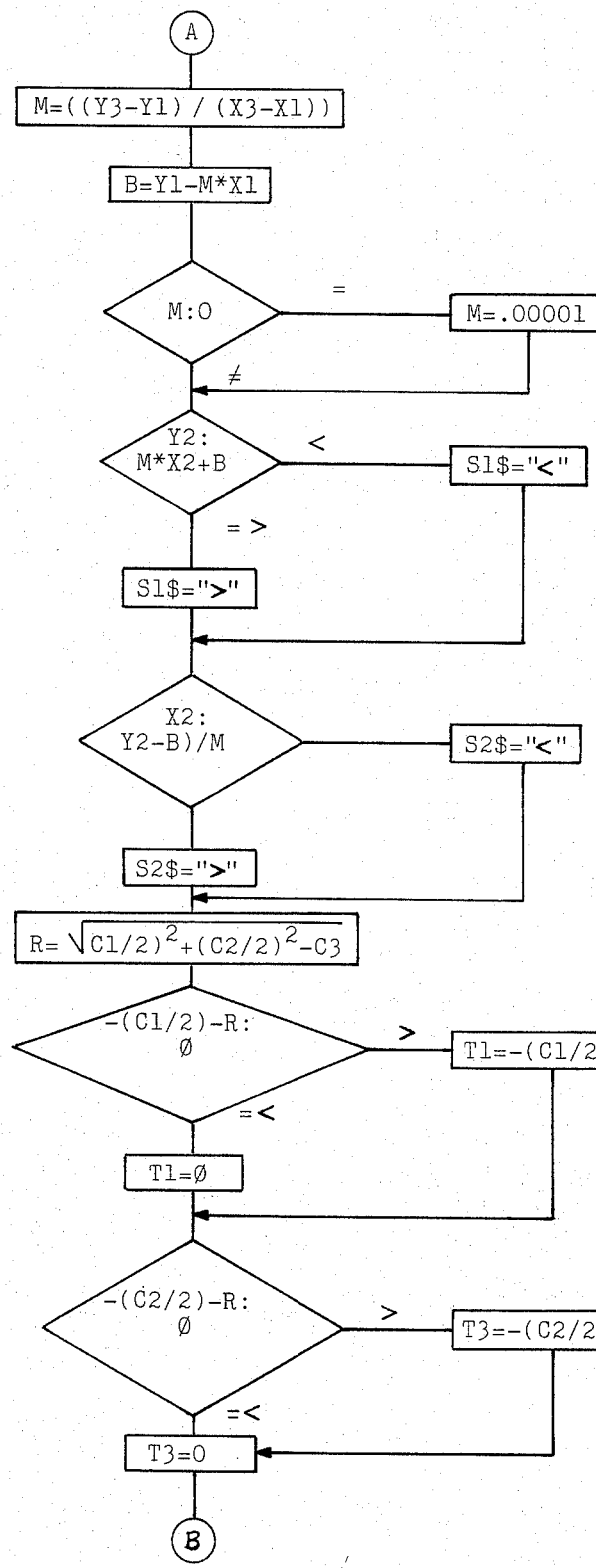
Figure 12E:
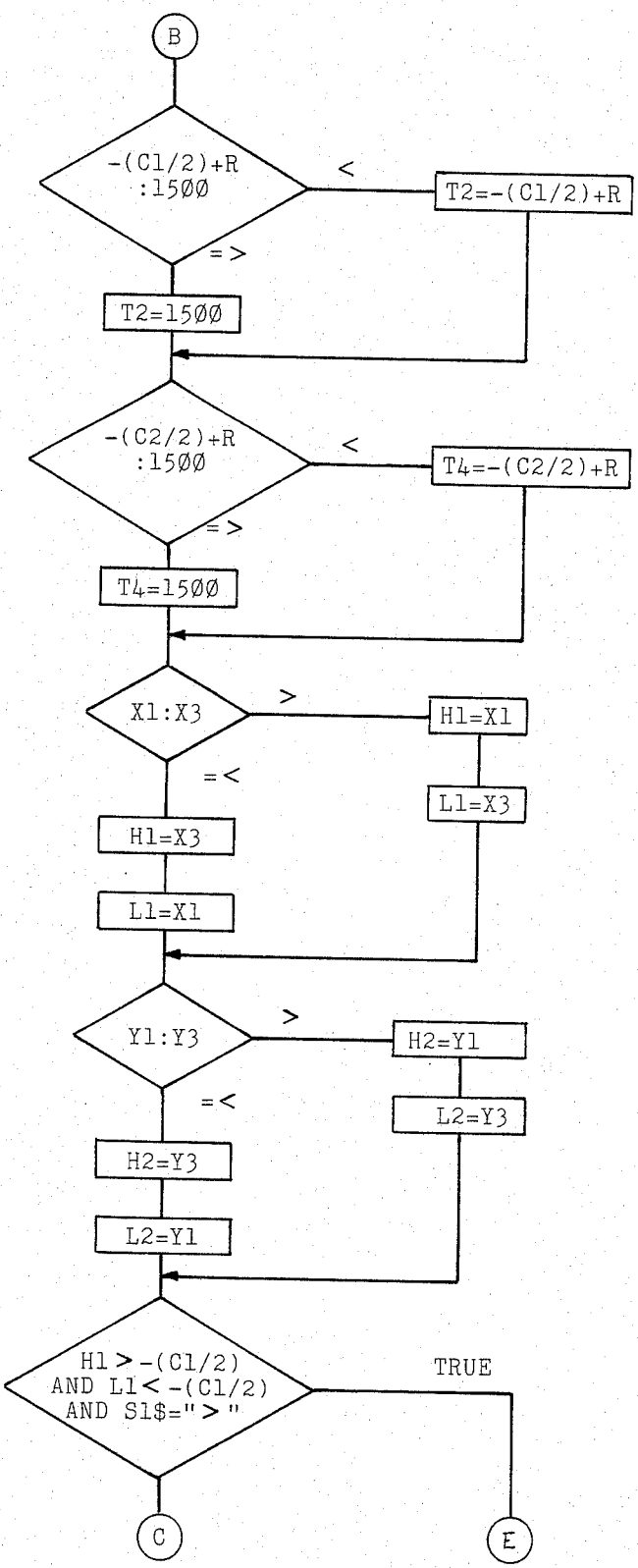
Figure 12F:
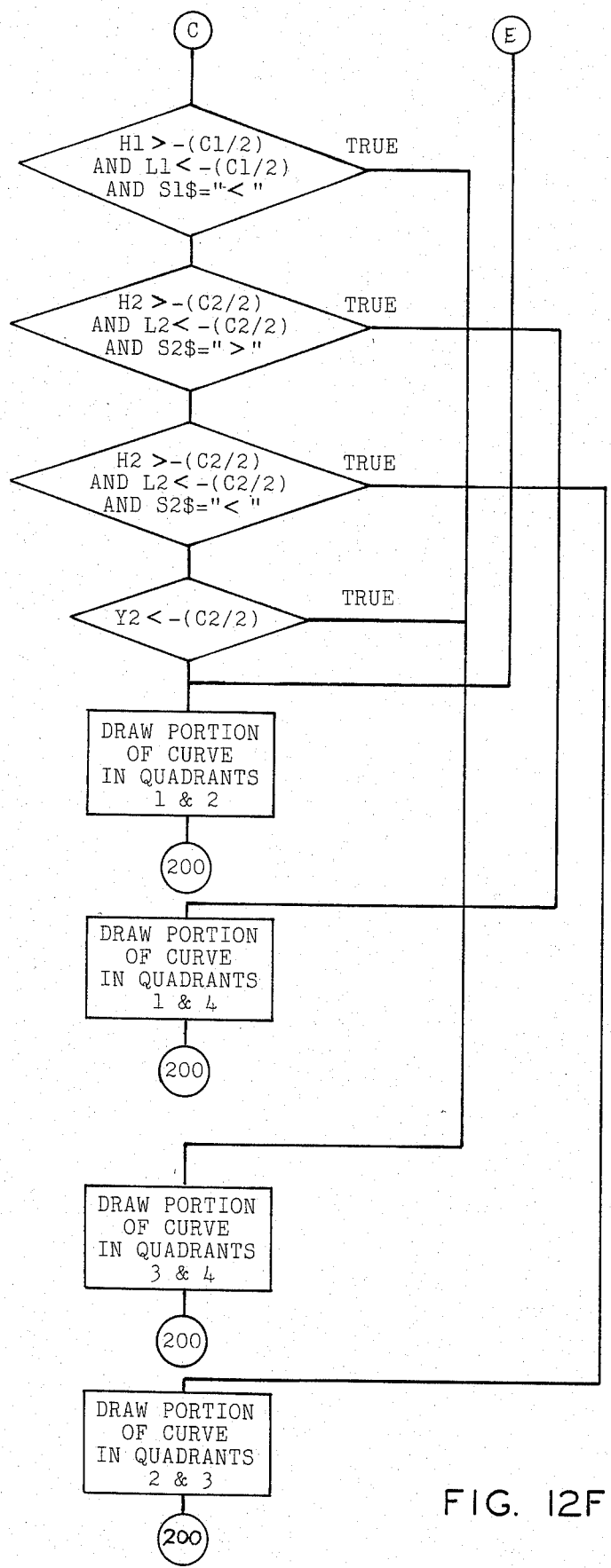
Figure 12G:
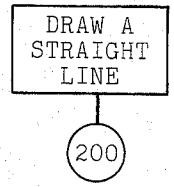
Figure 13A:
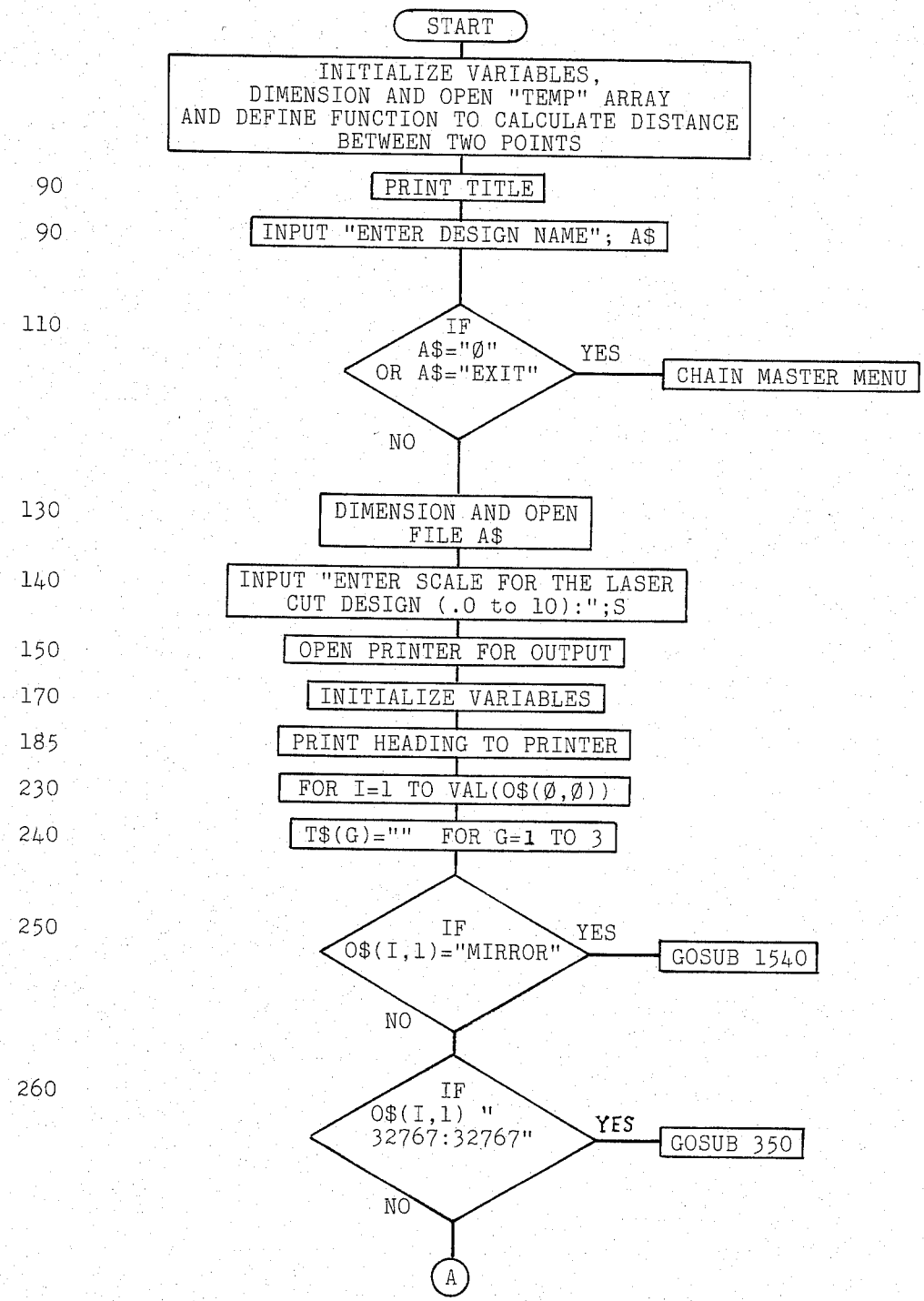
Figure 13C:
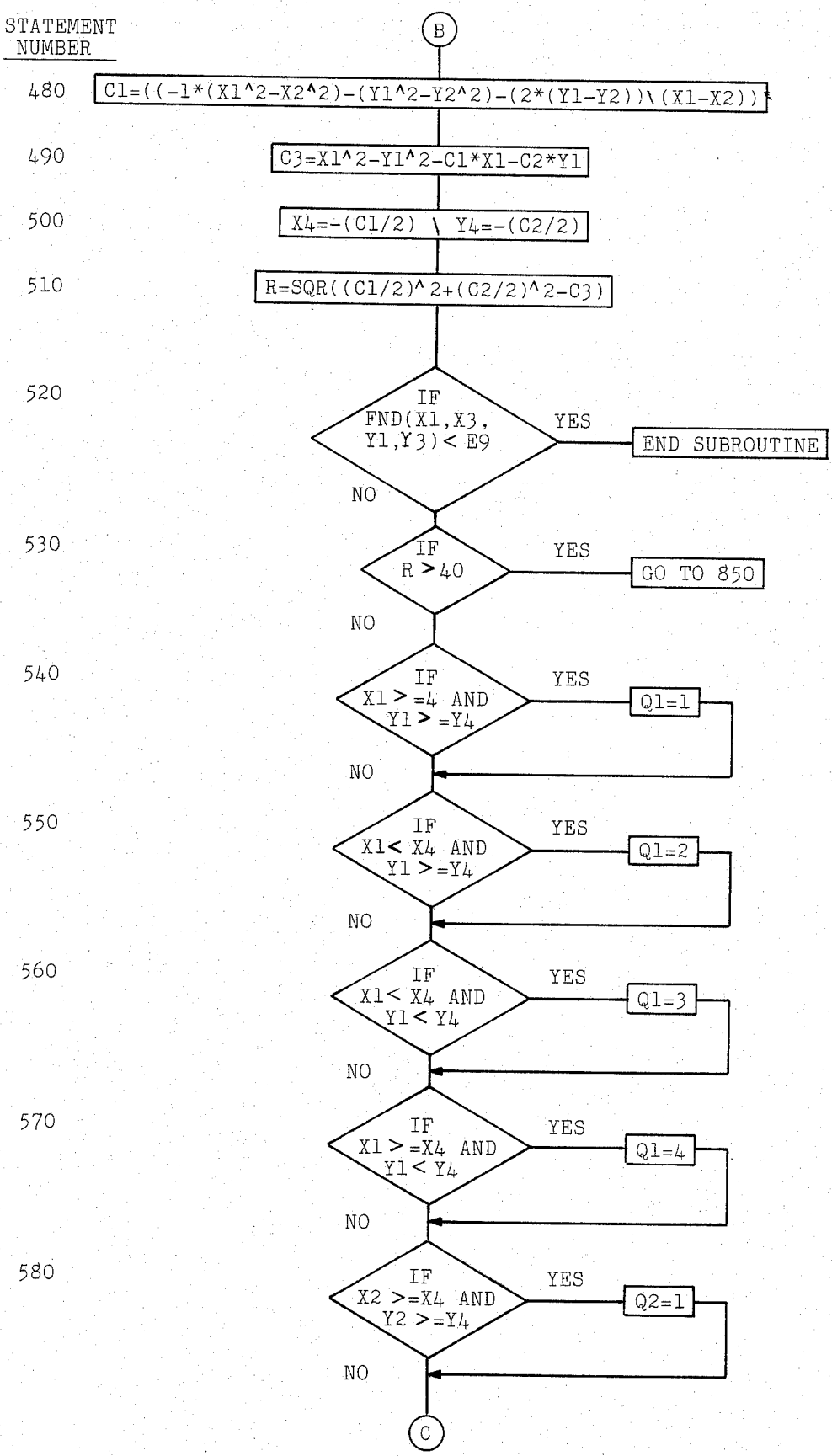
Figure 13D:
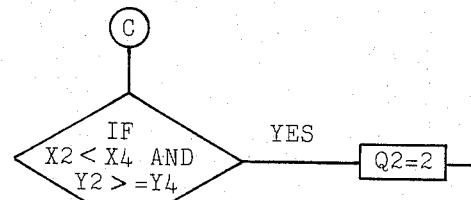
Figure 13D:
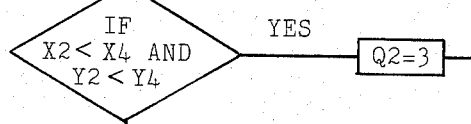
Figure 13D:
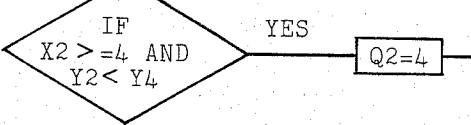
Figure 13D:
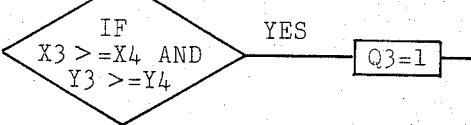
Figure 13D:
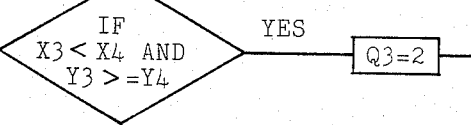
Figure 13D:
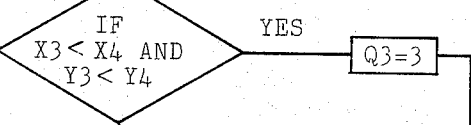
Figure 13D:
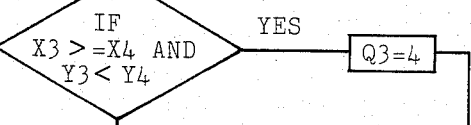
Figure 13D:
Figure 13D:
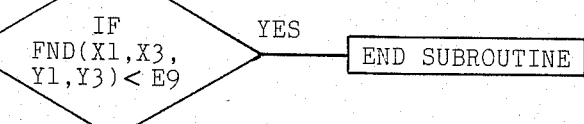
Figure 13E:
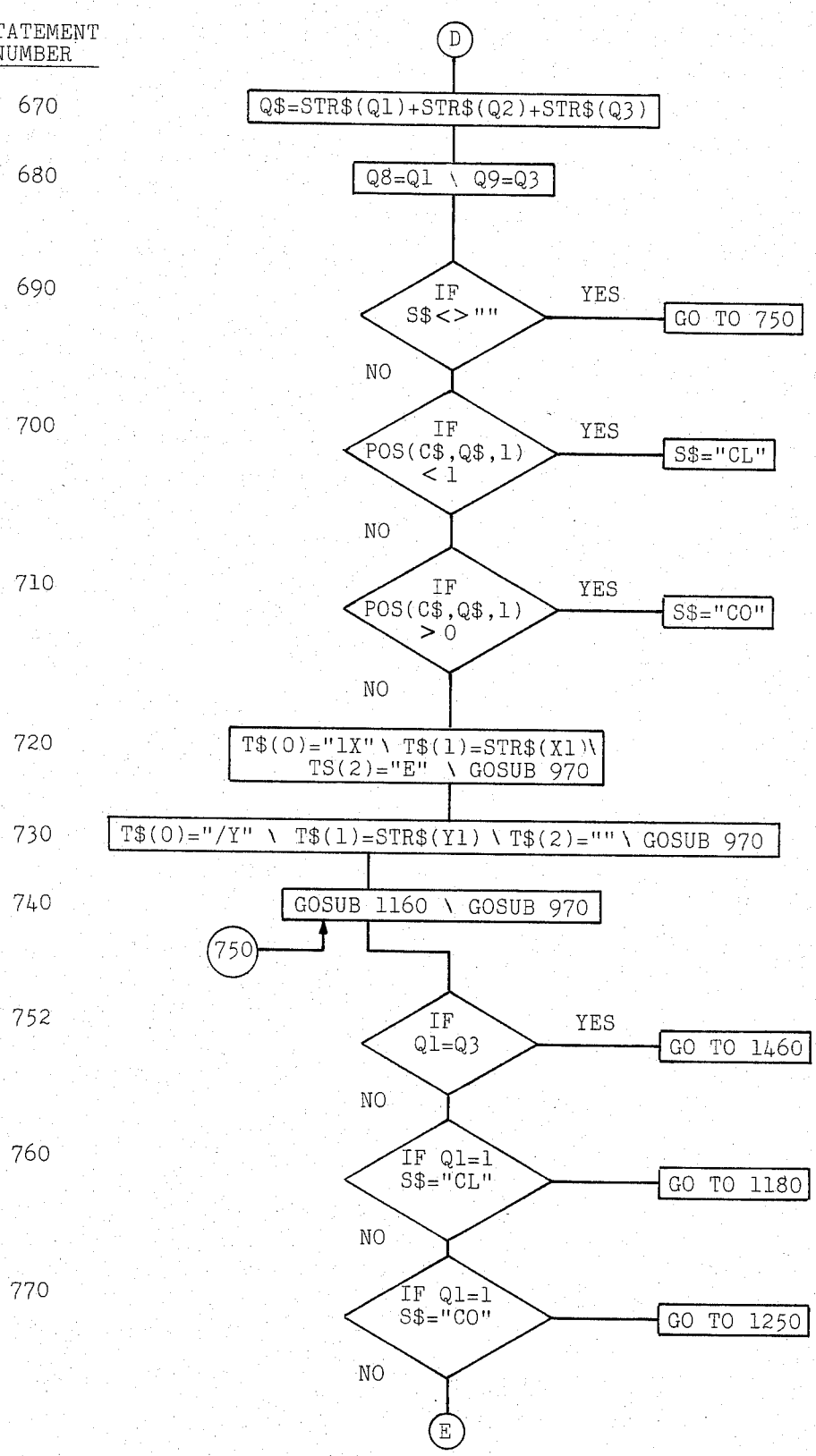
Figure 13F:
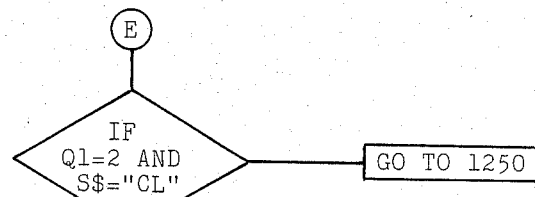
Figure 13F:
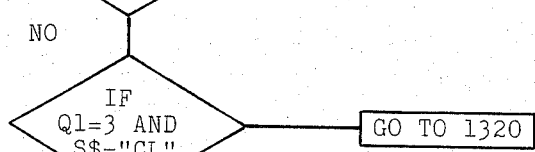
Figure 13F:
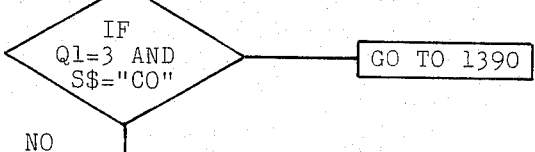
Figure 13F:
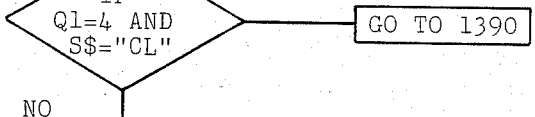
Figure 13F:
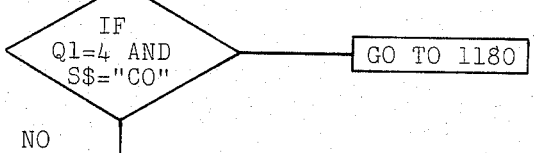
Figure 13F:
Figure 13F:
Figure 13H:
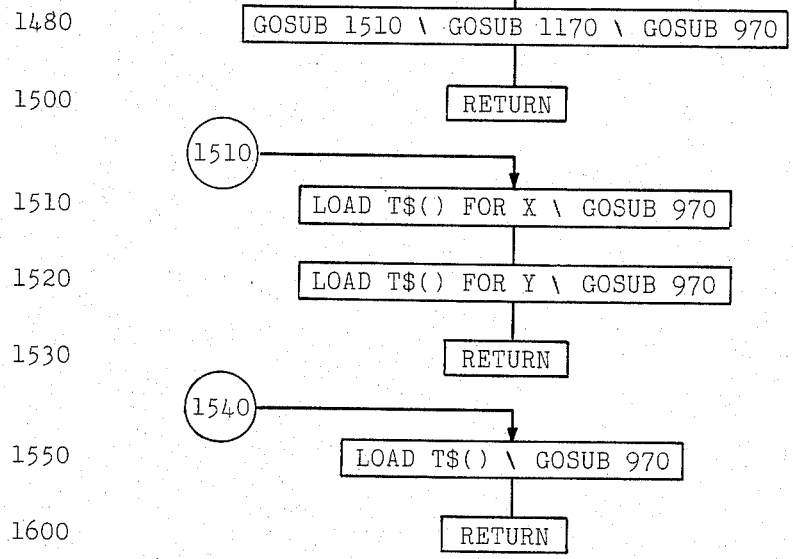

Refer now to FIG. 12A. As seen in the figure and by reference to the program itself, it can be seen that lines 10-140 are generally the same as in the prior program, in other words, the file is opened by setting up the location in the disc memory 154 where the points will be stored. In addition, the program asks how many points are to be checked or determined per unit of length. This is because a continuous line must be drawn from three points. The program therefore asks how far apart on the circular arc to determine the coordinates of points while drawing the complete arc. For many designs a suitable distance may typically be on the order of about 1/500 of an inch. The question is answered by the operator entering an arbitrary number to designate the distance. If 1/500 of an inch is selected, then for an arc 1 inch long, about 500 incremental points will be established along the length of an arc containing the three points that are stored.

Next, the size of the finished pattern is entered. The program asks the operator to enter the scale. By properly designating the scale, the pattern can be made natural size, ½ or double the natural size or of any other desired size. The program then asks the direction that the data is to be read, that is to say, backwards or forwards. In this way, the finished design can be plotted on the plotter beginning at its end and working toward the beginning or in the same direction as the points were entered. Beginning on line 160, the expression "main loop through the data file" refers to the operation of observing or looking at the record in storage and transferring it to the internal memory. It is then determined whether each line is straight or curved by determining whether or not the symbol is present for straight or curved lines. In the example given, the term "32767:32767" indicates a straight line.

In lines 210-1110, an arc is fed to the plotter which is then printed out by the plotter pen on a piece of paper. A subroutine is provided for this purpose. It is assumed that three points determine a circular arc. The program defines an equation for the center of a circle and then determines which part of the circle between the beginning and ending point is to be drawn, that is to say, going clockwise or counterclockwise around the circle to draw the proper arc. This direction is determined by where the intermediate point 141 (FIG. 6) is located on the circle. Since the center point, beginning and end are provided, the plotting is accomplished by picking the starting point of the arc and moving the pen to that point. With a defined X coordinate, the program then moves a selected distance to the right or left and determines what the Y coordinate is for that distance of lateral movement. The pen is then moved along the Y axis to that point. This is repeated stepwise many times until the arc is completed. Lines 210-580 define a relationship for determining the center point of an arc. Lines 320-350 define the circle of which the arc is a part and line 410 actually defines the radius of the circle as a unit of length.

In lines 1220–1250, the objective is to provide a means for printing straight lines. This is accomplished with a special symbol mentioned above. The operation is begun with the plotter pen at one end of the straight line. The program then controls the movement of the plotter in a straight line to the other point at the opposite end of the line. There may, however, be some unevenness to the line since the digital plotter is employed in this instance. From line 260 to the end of the program, primarily lines 160 to 200, causes the operation to be repeated until the entire design is plotted and displayed as a graphic representation on a paper sheet contained in the plotter. The end result is that the program signals the plotter to present the entire design without attention from the operator.

The third portion of the program set forth in FIG. 13 will now be described. The program as set forth in the drawing will be understood by reference to the following definitions and to the accompanying summary.

PRINT A LASER PROGRAM

| Variable Description | Temporary Work Variables |
|---|---|
| C9$ = Used to clear screen. | X, Y, L$, L1$, I, 6 |
| C$ = Constant used to determine direction of arc. | T$(), C1, C2, C3 |
| C = Multiplier. | Q8, Q9, T, W |
| E9 = Multiplier. | |
| P$(210,2) = Work File for Printout. | |
| A$ = Design Name. | |
| O$(2000,2) = Digitized points. | |
| S = Scale. | |
| P1 = Page number for the Laser Program. | |
| P2 = Pointer in P$(,). | |
| X1, X2, X3 = X coordinate. | |
| Y1, Y2, Y3 = Y coordinate. | |
| L1 = X Low point. | |
| L2 = Y Low point. | |
| H1 = X High point. | |
| H2 = Y High point. | |
| X4, Y4 = Center of circle. | |
| R = Radius of circle. | |
| Q1, Q2, Q3, Q4 = Points coordinates. | |
| S$ = Tells if arc goes clockwise or counterclockwise. | |

Summary

| Lines | Activity |
|---|---|
| 0–180 | Initialize constants, open files, dimension files. |
| 85–220 | Print leader for laser program. |
| 230–280 | Main loop to process pattern's point sets. Determine if line is an arc or straight and go to the appropriate routine. Also determine if this is a mirror point. |
| 290–320 | Print out commands to home the position of the cutter. |
| 330 | Check to make sure we have printed the whole table; if not, go to the print table routine. |
| 340 | Close program and end run. |
| 350–830 | Routine to process an arc. |
| 350–400 | Extract the lines coordinates. |
| 410 | Multiply by scaling factor. |
| 420–450 | Define high and low coordinates of line. |
| 460–520 | Define the circle the arc belongs to including center point and radius. |
| 530 | If arc radius is too large, treat arc as straight line and jump to routine to process straight line. |
| 540–650 | Determine the quadrant locations of the end points and the intermediate point of the arc. |
| 665 | Exit routine if arc is small enough. |
| 670–710 | Determine direction of arc, clockwise |

PRINT A LASER PROGRAM -continued

| | |
|---|---|
| | or counterclockwise. |
| 720–830 | Format the output line for the printer and put it in a talbe "P$(,). |
| 850–960 | Process straight line. |
| 970–1150 | Print table to printer. |
| 1160 | Command to turn laser on. |
| 1170 | Command to turn laser off. |
| 1180–1530 | Sub routines used when formating output in lines 720–830. |
| 1540–1600 | Print the trailer for the cutter position. |

The general object of this program is to print a hard copy of the program for each design in an appropriate format that can be understood by the cutting device. To begin the operation, constants are initialized and the files are opened and dimensioned. The leader sets forth the rate that the positioner will move. The scale factor determines the size to be produced in the finished stencil. If movement is "relative", the cutter will move the cutting means or cutting head along an axis relative to the beginning point. If "abosolute" movement is chosen, the cutting head will be moved from any given location to the next succeeding point without angular designation. Absolute movement is usually desired.

In lines 230–280, the same routine is used as described in connection with the PLOT A DESIGN program, lines 160+ to determine whether the lines are straight or curved. This routine is repeated for each arc.

In lines 290–320, the cutting head is moved to the lower left-hand corner of the work piece or uncut stencil sheet 156 before the cutting operation is to be started.

In line 330, the entire table of points catalogued for a particular design is printed. The objective is that for each set of points found in the line 230–280 loop, the cutter is informed that the line is straight or curved. Then for any given straight line, the beginning and ending point are placed in storage and for any curved line, the beginning point of the arc is given, the center of the arc is given and the end point is given moving from the beginning to the end. For each design, all of the arcs and straight lines that have been stored, e.g., from, say, 20 to 100 lines, are printed. This is repeated until the entire quantity of data in storage is exhausted and all is printed.

Having now fully defined the terms employed in the program and presented summaries, the entire program made up of program portions described in FIGS. 11, 12 and 13 will now be presented below.

As described above for the PLOT A DESIGN program, the present program functions to print out that portion of a complete circle of which the arc selected is a part while omitting the remaining portion of the circle outside the beginning and ending point and not containing the intermediate point. The program then causes the cutter to loop through each of the three selected points in the same order that they were entered. The center point of each arc is determined as the cutter traces the arc.

The invention has proved highly effective. When a laser is used for cutting, it is possible to cut slots in a sheet of plastic at the rate of about 7 inches per second. A simple pattern such as that shown in FIG. 2 can be done at the rate of about 6 per minute, and virtually any design can be reproduced.

Refer now to the listing of the entire program presented below.

```
10 REM --------- CP0001 ---- ENTER A NEW DESIGN ---------
20 DIM #1,O$(2000,2)=13
30 OPEN "TT2:" FOR INPUT AS FILE #1
40 P9=.15
50 PRINT CHR$(155)+"H"+CHR$(155)+"J";
60 PRINT CLK$,"ENTER A NEW DESIGN",DAT$
70 PRINT \ PRINT
80 PRINT "ENTER NEW DESIGN NAME: "; \ INPUT #0,A$
90 IF A$="0" THEN CLOSE  \ CHAIN "MASTER"
100 IF A$="EXIT" THEN CLOSE  \ CHAIN "MASTER"
110 OPEN "RK1:"+A$ AS FILE #2
120 O$(0,0)="0"
130 O=VAL(O$(0,0))+1 \ O$(0,0)=STR$(O)
140 FOR X=0 TO 2
150 INPUT #1,B$ \ INPUT #1,D$
160 PRINT B$
170 IF X=0 THEN IF SEG$(B$,1,1)="0" THEN O$(0,0)=STR$(-1+VAL(O$(0,0)))
171 IF X=0 THEN IF SEG$(B$,1,1)="0" THEN  GO TO 250
180 B1$=SEG$(B$,2,7) \ B2$=SEG$(B$,8,13)
190 B1(X+1)=VAL(B1$) \ B2(X+1)=VAL(B2$)+150
210 NEXT X
211 IF ABS(B1(1)-B1(2))<10 THEN IF B2(1)<>B2(2) THEN B1(2)=B1(2)+10
220 IF ABS(B1(1)-B1(2))<10 THEN IF ABS(B2(1)-B2(2))<10 THEN B1(2)=32767
221 IF ABS(B1(1)-B1(2))<10 THEN IF ABS(B2(1)-B2(2))<10 THEN B2(2)=32767
222 IF B2(2)=32767 THEN PRINT "STRAIGHT LINE"
225 O$(O,X)=STR$(B1(X+1))+":"+STR$(B2(X+1))
229 NEXT X
230 PRINT
240 GO TO 130
250 IF S$="MIRROR" THEN  GO TO 380
260 B1=VAL(SEG$(B$,2,7))
270 O$(O,1)=STR$(B1)
280 PRINT "DO YOU WANT TO MIRROR THIS DESIGN "; \ INPUT #0,R$
290 IF SEG$(R$,1,1)<>"Y" THEN  GO TO 380
300 O$(O,0)=STR$(VAL(O$(O,0))+1)
310 O=VAL(O$(O,0))
320 O$(O,1)="MIRROR"
330 O$(O,2)="MIRROR"
340 PRINT "DO YOU WANT TO PRINT ANY MORE LINES AFTER THE MIRROR ";
341 INPUT #0,R$
350 IF SEG$(R$,1,1)<>"Y" THEN  GO TO 380
360 S$="MIRROR"
370 GO TO 130
380 REM
390 FOR X=VAL(O$(0,0)) TO 1 STEP -1
400 PRINT X;CHR$(13);
410 IF O$(X,1)="MIRROR" THEN  GO TO 490
420 FOR Y=0 TO 2
430 IF O$(X,Y)="32767:32767" THEN  GO TO 480
440 P=POS(O$(X,Y),":",1)
450 X1=VAL(SEG$(O$(X,Y),1,P-1))
460 X1=X1-B1
470 O$(X,Y)=STR$(X1)+SEG$(O$(X,Y),P,LEN(O$(X,Y)))
480 NEXT Y
490 NEXT X
500 PRINT
510 CLOSE \ CHAIN "MASTER"
520 END
 10 C9$=CHR$(27)+"H"+CHR$(27)+"J"
 15 ON ERROR GO TO 25000
 20 PRINT C9$;CLK$,"PRINT A DESIGN",DAT$ \ PRINT \ PRINT
 30 PRINT "ENTER DESIGN NAME OR NUMBER:"; \ INPUT #0,A$ \ DIM #1,O$(2000,2)=13
 40 IF A$="0" THEN CHAIN "MASTER"
 50 IF A$="EXIT" THEN CHAIN "MASTER"
 60 OPEN "RK1:"+A$ AS FILE #1
 70 PRINT "ENTER THE ACCURACY (1-10) "; \ INPUT #0,I1
 72 PRINT "ENTER THE SCALE    (.1-10) "; \ INPUT #0,S
 80 OPEN "TT1:" FOR OUTPUT AS FILE #6
 85 PRINT #6,"_"
```

```
 90 PRINT #6,";:H" \ PRINT #6,";:A 1200,1200" \ PRINT #6,";:H"
100 C=1/5*S
110 PRINT #6,";:U" \ S3$="U"
120 PRINT "F(ORWARDS), B(ACKWARDS):"; \ INPUT #0,A1$
130 IF A1$="B" THEN I8=VAL(O$(0,0)) \ I9=1 \ I7=-1
140 IF A1$<>"B" THEN I8=1 \ I9=VAL(O$(0,0)) \ I7=1
150 IF O$(0,2)="MIRROR" THEN GOSUB 1270
160 FOR I=I8 TO I9 STEP I7
170 IF O$(I,1)="MIRROR" THEN GOSUB 1380 \ GO TO 200
180 IF O$(I,1)<>"32767:32767" THEN GOSUB 210 \ GO TO 200
190 GOSUB 1120
200 NEXT I \ CLOSE \ CHAIN "MASTER"
210 X1=VAL(SEG$(O$(I,0),1,POS(O$(I,0),":",1)-1))*C
220 X2=VAL(SEG$(O$(I,1),1,POS(O$(I,1),":",1)-1))*C
230 X3=VAL(SEG$(O$(I,2),1,POS(O$(I,2),":",1)-1))*C
240 Y1=VAL(SEG$(O$(I,0),POS(O$(I,0),":",1)+1,LEN(O$(I,0))))*C
250 Y2=VAL(SEG$(O$(I,1),POS(O$(I,1),":",1)+1,LEN(O$(I,1))))*C
260 Y3=VAL(SEG$(O$(I,2),POS(O$(I,2),":",2)+1,LEN(O$(I,2))))*C
270 X1=X1/C \ X2=X2/C \ X3=X3/C
280 X1=X1+C7 \ X2=X2+C7 \ X3=X3+C7
290 IF S$="MIRROR" THEN X1=2*C7-X1 \ X2=2*C7-X2 \ X3=2*C7-X3
300 PRINT X1;X2;X3,Y1;Y2;Y3
310 X1=X1*C \ X2=X2*C \ X3=X3*C
321 C3=(-X1*(X1^2-X2^2)-X1*(Y1^2-Y2^2)+X3*(X1^2-X2^2)+X3*(Y1^2-Y2^2))
322 C2=(-1*(X3^2-X1^2)-(Y3^2-Y1^2)+C3/(X1-X2))
330 C2=C2/(Y3-Y1+(X1*(Y1-Y2)-X3*(Y1-Y2))/(X1-X2))
340 C1=((-1*(X1^2-X2^2)-(Y1^2-Y2^2)-C2*(Y1-Y2))/(X1-X2))
350 C3=-X1^2-Y1^2-C1*X1-C2*Y1
360 M=((Y3-Y1)/(X3-X1)) \ B=Y1-M*X1 \ IF M=0 THEN M=1.0000000000000E-06
365 PRINT M
370 IF Y2<M*X2+B THEN S1$="<" \ GO TO 390
380 S1$=">"
390 IF X2<(Y2-B)/M THEN S2$="<" \ GO TO 410
400 S2$=">"
410 R=SQR((C1/2)^2+(C2/2)^2-C3)
420 REM
430 IF (-(C1/2)-R)>0 THEN T1=(-(C1/2)-R) \ GO TO 450
440 T1=0
450 IF (-(C2/2)-R)>0 THEN T3=(-(C2/2)IF X1>X3 THEN H1=X1 \ GO TO 530
520 H1=X3
530 IF X1<X3 THEN L1=X1 \ GO TO 550
540 L1=X3
550 IF Y1>Y3 THEN H2=Y1 \ GO TO 570
560 H2=Y3
570 IF Y1<Y3 THEN L2=Y1 \ GO TO 590
580 L2=Y3
590 IF H1>-(C1/2) THEN IF L1<-(C1/2) THEN IF S1$=">" THEN GO TO 640
592 IF H1>-(C1/2) THEN IF L1<-(C1/2) THEN IF S1$="<" THEN GO TO 880
594 IF H2>-(C2/2) THEN IF L2<-(C2/2) THEN IF S2$=">" THEN GO TO 760
596 IF H2>-(C2/2) THEN IF L2<-(C2/2) THEN IF S2$="<" THEN GO TO 1000
598 IF Y2<-(C2/2) THEN GO TO 880
640 REM
650 FOR X=L1 TO H1 STEP I1
660 Y=SQR((C2/2)^2-(X^2+C1*X+C3))-(C2/2)
670 IF S1$="<" THEN IF Y>M*X+B THEN GO TO 750
680 IF S1$=">" THEN IF Y<M*X+B THEN GO TO 750
690 IF S2$="<" THEN IF X>(Y-B)/M THEN GO TO 750
700 IF S2$=">" THEN IF X<(Y-B)/M THEN GO TO 750
710 IF Y<0 THEN GO TO 750
720 IF Y>1500 THEN GO TO 750
730 PRINT #6,FNS$(X,Y)
740 IF S3$="U" THEN PRINT #6,";:D" \ S3$="D"
750 NEXT X \ PRINT #6,";:U" \ S3$="U" \ RETURN
760 REM
770 FOR Y=L2 TO H2 STEP I1
780 X=SQR((C1/2)^2-(Y^2+C2*Y+C3))-(C1/2)
790 IF S1$="<" THEN IF Y>M*X+B THEN GO TO 870
800 IF S1$=">" THEN IF Y<M*X+B THEN GO TO 870
810 IF S2$="<" THEN IF X>(Y-B)/M S3$="U" THEN PRINT #6,";:D" \ S3$="D"
870 NEXT Y \ PRINT #6,";:U" \ S3$="U" \ RETURN
```

```
880 REM
890 FOR X=L1 TO H1 STEP I1
900 Y=-SQR((C2/2)^2-(X^2+C1*X+C3))-(C2/2)
910 IF S1$='<' THEN IF Y>M*X+B THEN  GO TO 990
920 IF S1$='>' THEN IF Y<M*X+B THEN  GO TO 990
930 IF S2$='<' THEN IF X>(Y-B)/M THEN  GO TO 990
940 IF S2$='>' THEN IF X<(Y-B)/M THEN  GO TO 990
950 IF Y<0 THEN  GO TO 930
960 IF Y>1500 THEN  GO TO 930
970 PRINT #6,FNS$(X,Y)
980 IF S3$="U" THEN PRINT #6,";:D" \ S3$="D"
990 NEXT X \ PRINT #6,";:U" \ S3$="U" \ RETURN
1000 REM
1010 FOR Y=L2 TO H2 STEP I1
1020 X=-SQR((C1/2)^2-(Y^2+C2*Y+C3))-(C1/2)
1030 IF S1$='<' THEN IF Y>M*X+B THEN  GO TO 1110
1040 IF S1$='>' THEN IF Y<M*X+B THEN  GO TO 1110
1050 IF S2$='<' THEN IF X>(Y-B)/M THEN  GO TO 1110
1060 IF S2$='>' THEN IF X<(Y-B)/M THEN  GO TO 1110
1070 IF X<0 THEN  GO TO 1110
1080 IF X>1500 THEN  GO TO 1110
1090 PRINT #6,FNS$(X,Y)
1100 IF S3$="U" THEN PRINT #6,";:D" \ S3$="D"
1110 NEXT Y \ PRINT #6,";:U" \ S3$="U" \ RETURN
1120 REM DRAW A LINE
1130 PRINT #6,";:U"
1140 X=VAL(SEG$(O$(I,0),1,POS(O$(I,0),":",1)-1))*C
1150 Y=VAL(SEG$(O$(I,0),POS(O$(I,0),":",1)+1,LEN(O$(I,0))))*C
1160 X=X/C \ X=X+C7 \ IF S$="MIRROR" THEN X=2*C7-X
1170 X=X*C
1180 PRINT #6,FNS$(X,Y)
1190 PRINT #6,";:D"
1200 X=VAL(SEG$(O$(I,2),1,POS(O$(I,2),":",1)-1))*C
1210 Y=VAL(SEG$(O$(I,2),POS(O$(I,2),":",1)+1,LEN(O$(I,2))))*C
1220 X=X/C \ X=X+C7 \ IF S$="MIRROR" THEN X=2*C7-X
1230 X=X*C
1240 PRINT #6,FNS$(X,Y)
1250 PRINT #6,";:U" \ RETURN
1260 DEF FNS$(X,Y)=";:A "+STR$(INT(X+.5))+","+STR$(INT(Y+.5))
1270 C7=VAL(O$(0,1))
1280 FOR X=1 TO VAL(O$(0,0))
1290 IF O$(X,1)="MIRROR" THEN  GO TO 1360
1300 FOR Y=0 TO 2
1310 IF O$(X,Y)="32767:3NEXT X
1370 RETURN
1380 S$="MIRROR"
1390 I2=I
1400 FOR T=I-1 TO 1 STEP -1
1410 I=T
1420 IF O$(I,1)<>"32767:32767" THEN  GOSUB 210 \ GO TO 1440
1430 GOSUB 1120
1440 NEXT T
1450 S$=""
1460 I=I2 \ RETURN
1470 END
25000 IF ERL=330 THEN O$(I,1)="32767:32767" \ RESUME 1120
25010 IF ERR<>61 THEN  GO TO 25090
25020 P=POS(O$(I,0),":",1) \ E=VAL(SEG$(O$(I,0),1,P-1))+10
25030 O$(I,0)=STR$(E)+SEG$(O$(I,0),P,LEN(O$(I,0)))
25040 I=I-1 \ RESUME 1370
10 PRINT
20 C9$=CHR$(155)+"H"+CHR$(155)+"J"
30 C$="112,122,123,113,223,233,224,244,334,344,341,"
32 C$=C$+"331,311,441,411,412,442,422,133,234"
40 C=1.000000000000E-03
50 DEF FNO(F1,F2,F3,F4)=SQR((F1-F2)^2+(F3-F4)^2)
60 E9=5.000000000000E-04
70 DIM #10,P$(210,2) \ OPEN "TEMP" AS FILE #10
80 FOR X=1 TO 202 \ FOR Y=0 TO 2 \ P$(X,Y)="" \ NEXT Y \ NEXT X
90 PRINT C9$;CLK$,"PRINT OUT LASER'S PROGRAM ",DAT$ \ PRINT
```

```
92 PRINT "ENTER DESIGN NAME ";  \ INPUT #0,A$
100 IF A$="0" THEN CLOSE  \ CHAIN "MASTER"
110 IF A$="EXIT" THEN CLOSE  \ CHAIN "MASTER"
120 DIM #1,O$(2000,2)=15
130 OPEN "RK1:"+A$ AS FILE #1
140 PRINT "ENTER SCALE FOR THE LASER CUT DESIGN (.1 TO 10): ";  \ INPUT #0,S
150 OPEN "LS:" FOR OUTPUT AS FILE #6
160 P1=0 \ P2=3
170 L$="####.  'L ##.####- 'L"
180 L1$="####. 'LLLLLLLLLLLLL"
185 PRINT #6,"COPYRIGHT 1981   WOOD-TICS, INC.   NEW BRIGHTON, MINN.   55112"
190 PRINT #6,"PATTERN NUMBER -- "A$
200 PRINT #6,"SCALE IS -- ";S \ PRINT #6
210 PRINT #6,"    1. F45."
220 PRINT #6,"    2. G90 "
230 FOR I=1 TO VAL(O$(0,0))
240 FOR G=0 TO 3 \ T$(G)="" \ NEXT G
250 IF O$(I,1)="MIRROR" THEN  GOSUB 1540 \ GO TO 280
260 IF O$(I,1)<>"32767:32767" THEN  GOSUB 350 \ GO TO 280
270 GOSUB 850
280 NEXT I
290 T$(0)="A"
300 T$(1)="/X 0    E" \ GOSUB 970
310 T$(1)="/Y 0" \ GOSUB 970
320 T$(1)="M2" \ GOSUB 970
330 IF P2>3 THEN  GOSUB 1020
340 CLOSE  \ CHAIN "MASTER"
350 X1=VAL(SEG$(O$(I,0),1,POS(O$(I,0),":",1)-1))*C
360 X2=VAL(SEG$(O$(I,1),1,POS(O$(I,1),":",1)-1))*C
370 X3=VAL(SEG$(O$(I,2),1,POS(O$(I,2),":",1)-1))*C
380 Y1=VAL(SEG$(O$(I,0),POS(O$(I,0),":",1)+1,LEN(O$(I,0))))*C
390 Y2=VAL(SEG$(O$(I,1),POS(O$(I,1),":",1)+1,LEN(O$(I,1))))*C
400 Y3=VAL(SEG$(O$(I,2),POS(O$(I,2),":",2)+1,LEN(O$(I,2))))*C
410 Y1=Y1*S \ Y2=Y2*S \ Y3=Y3*S
420 IF X1>X3 THEN H1=X1 \ L1=X3
430 IF X1<=X3 THEN H1=X3 \ L1=X1
440 IF Y1>Y3 THEN H2=Y1 \ L2=Y3
450 IF Y1<=Y3 THEN H2=Y3 \ L2=Y1
461 C3=(-X1*(X1^2-X2^2)-X1*(Y1^2-Y2^2)+X3*(X1^2-X2^2)+X3*(Y1^2-Y2^2))
462 C2=(-1*(X3^2-X1^2)-(Y3^2-Y1^2)+C3/(X1-X2))
470 C2=C2/(Y3-Y1+(X1*(Y1-Y2)-X3*(Y1-Y2))/(X1-X2))
480 C1=((-1*(X1^2-X2^2)-(Y1^2-Y2^2)-C2*(Y1-Y2))/(X1-X2))
490 C3=-X1^2-Y1^2-C1*X1-C2*Y1
500 X4=-(C1/2) \ Y4=-(C2/2)
510 R=SQR((C1/2)^2+(C2/2)^2-C3)
520 IF FND(X1,X3,Y1,Y3)<E9 THEN RETURN
530 IF R>40 THEN  GO TO 850
540 IF X1>=X4 THEN IF Y1>=Y4 THEN Q1=1
550 IF X1<X4 THEN IF Y1>=Y4 THEN Q1=2
560 IF X1<X4 THEN IF Y1<Y4 THEN Q1=3
570 IF X1>=X4 THEN IF Y1<Y4 THEN Q1=4
580 IF X2>=X4 THEN IF Y2>=Y4 THEN Q2=1
590 IF X2<X4 THEN IF Y2>=Y4 THEN Q2=2
600 IF X2<X4 THEN IF Y2<Y4 THEN Q2=3
610 IF X2>=X4 THEN IF Y2<Y4 THEN Q2=4
620 IF X3>=X4 THEN IF Y3>=Y4 THEN Q3=1
630 IF X3<X4 THEN IF Y3>=Y4 THEN Q3=2
640 IF X3<X4 THEN IF Y3<Y4 THEN Q3=3
650 IF X3>=X4 THEN IF Y3<Y4 THEN Q3=4
660 S$=""
665 IF FND(X1,X3,Y1,Y3)<E9 THEN RETURN
670 Q$=STR$(Q1)+STR$(Q2)+STR$(Q3)
680 Q8=Q1 \ Q9=Q3
690 IF S$<>"" THEN  GO TO 750
700 IF POS(C$,Q$,1)<1 THEN S$="CL"
710 IF POS(C$,Q$,1)>0 THEN S$="CO"
720 T$(0)="/X" \ T$(1)=STR$(X1) \ T$(2)="E" \ GOSUB 970
730 T$(0)="/Y" \ T$(1)=STR$(Y1) \ T$(2)="" \ GOSUB 970
740 GOSUB 1160 \ GOSUB 970
```

```
750 REM
752 IF Q1=Q3 THEN  GO TO 1460
760 IF Q1=1 THEN IF S$="CL" THEN  GO TO 1180
770 IF Q1=1 THEN IF S$="CO" THEN  GO TO 1250
780 IF Q1=2 THEN IF S$="CL" THEN  GO TO 1250
790 IF Q1=2 THEN IF S$="CO" THEN  GO TO 1320
800 IF Q1=3 THEN IF S$="CL" THEN  GO TO 1320
810 IF Q1=3 THEN IF S$="CO" THEN  GO TO 1390
820 IF Q1=4 THEN IF S$="CL" THEN  GO TO 1390
830 IF Q1=4 THEN IF S$="CO" THEN  GO TO 1180
840 STOP
850 REM PROCESS STRAIGHT LINE
860 Q1=POS(O$(I,0),":",1) \ Q2=POS(O$(I,2),":",1)
870 X1=VAL(SEG$(O$(I,0),1,Q1-1)) \ X2=VAL(SEG$(O$(I,2),1,Q2-1))
880 Y1=VAL(SEG$(O$(I,0),Q1+1,LEN(O$(I,0))))
890 Y2=VAL(SEG$(O$(I,2),Q2+1,LEN(O$(I,2))))
900 X1=X1*C*S \ X2=X2*C*S \ Y1=Y1*C*S \ Y2=Y2*C*S
910 T$(0)="/X" \ T$(1)=STR$(X1) \ T$(2)="E" \ GOSUB 970
920 T$(0)="/Y" \ T$(1)=STR$(Y1) \ T$(2)="" \ GOSUB 970
930 GOSUB 1160 \ GOSUB 970
940 T$(0)=" X" \ T$(1)=STR$(X2) \ T$(2)="E" \ GOSUB 970
950 T$(0)=" Y" \ T$(1)=STR$(Y2) \ T$(2)="" \ GOSUB 970
960 GOSUB 1170 \ GOSUB 970 \ RETURN
970 REM PRINT POINTS
980 FOR W=0 TO 2 \ P$(P2,W)=T$(W) \ NEXT W
990 PRINT P2;
1000 P2=P2+1
1010 IF P2<203 THEN RETURN
1020 FOR T=3 TO 52
1030 IF LEN(P$(T,0)+P$(T,1)+P$(T,2))<1 THEN  GO TO 1120
1040 IF P$(T,0)="A" THEN PRINT #6,USING L1$,200*P1+T,P$(T,1); \ GO TO 1060
1050 PRINT #6,USING L$,P1*200+T,P$(T,0),VAL(P$(T,1)),P$(T,2);
1060 IF P$(T+50,0)="A" THEN PRINT #6,USING L1$,200*P1+T+50,P$(T+50,1);
1061 IF P$(T+50,0)="A" THEN  GO TO 1080
1070 PRINT #6,USING L$,P1*200+T+50,P$(T+50,0),VAL(P$(T+50,1)),P$(T+50,2);
1080 IF P$(T+100,0)="A" THEN PRINT #6,USING L1$,200*P1+T+100,P$(T+100,1);
1081 IF P$(T+100,0)="A" THEN  GO TO 1100
1090 PRINT #6,USING L$,P1*200+T+100,P$(T+100,0),VAL(P$(T+100,1)),P$(T+100,2);
1100 IF P$(T+150,0)="A" THEN PRINT #6,USING L1$,200*P1+T+150,P$(T+150,1)
1101 IF P$(T+150,0)="A" THEN  GO TO 1120
1110 PRINT #6,USING L$,P1*200+T+150,P$(T+150,0),VAL(P$(T+150,1)),P$(T+150,2)
1120 NEXT T
1130 P1=P1+1
1140 FOR T=3 TO 202 \ FOR U=0 TO 2 \ P$(T,U)="" \ NEXT U \ NEXT T
1150 PRINT #6,CHR$(12) \ P2=3 \ RETURN
1160 T$(0)="A" \ T$(1)="M90" \ RETURN
1170 T$(0)="A" \ T$(1)="M91" \ RETURN
1180 T$(0)=" X" \ T$(1)=STR$(X4+R) \ T$(2)="E" \ GOSUB 970
1190 T$(0)=" Y" \ T$(1)=STR$(Y4) \ T$(2)="E" \ GOSUB 970
1200 X1=X4+R \ Y1=Y4
1210 GOSUB 1510
1220 IF S$="CL" THEN Q1=4
1230 IF S$="CO" THEN Q1=1
1240 GO TO 750
1250 T$(0)=" X" \ T$(1)=STR$(X4) \ T$(2)="E" \ GOSUB 970
1260 T$(0)=" Y" \ T$(1)=STR$(Y4+R) \ T$(2)="E" \ GOSUB 970
1270 X1=X4 \ Y1=Y4+R
1280 GOSUB 1510
1290 IF S$="CL" THEN Q1=1
1300 IF S$="CO" THEN Q1=2
1310 GO TO 750
1320 T$(0)=" X" \ T$(1)=STR$(X4-R) \ T$(2)="E" \ GOSUB 970
1330 T$(0)=" Y" \ T$(1)=STR$(Y4) \ T$(2)="E" \ GOSUB 970
1340 X1=X4-R \ Y1=Y4
1350 GOSUB 1510
1360 IF S$="CL" THEN Q1=2
1370 IF S$="CO" THEN Q1=3
1380 GO TO 750
1390 T$(0)=" X" \ T$(1)=STR$(X4) \ T$(2)="E" \ GOSUB 970
1400 T$(0)=" Y" \ T$(1)=STR$(Y4-R) \ T$(2)="E" \ GOSUB 970
```

```
1410 X1=X4 \ Y1=Y4-R
1420 GOSUB 1510
1430 IF S$="CL" THEN Q1=3
1440 IF S$="CO" THEN Q1=4
1450 GO TO 750
1460 IF FND(X1,X3,Y1,Y3)<E9 THEN  GO TO 1490
1465 T$(0)=" X" \ T$(1)=STR$(X3) \ T$(2)="E" \ GOSUB 970
1470 T$(0)=" Y" \ T$(1)=STR$(Y3) \ T$(2)="E" \ GOSUB 970
1480 GOSUB 1510
1490 GOSUB 1170 \ GOSUB 970
1500 RETURN
1510 T$(0)="/X" \ T$(1)=STR$(X4) \ T$(2)="E" \ GOSUB 970
1520 T$(0)="/Y" \ T$(1)=STR$(Y4) \ T$(2)="" \ GOSUB 970
1530 RETURN
1540 T$(0)="A"
1550 T$(1)=" X0   E" \ GOSUB 970
1560 T$(1)="G60" \ GOSUB 970
1570 T$(1)="/G2" \ GOSUB 970
1580 T$(1)="N3" \ GOSUB 970
1590 T$(1)="G60" \ GOSUB 970
1600 RETURN
```

Many variations will be apparent to those skilled in the art within the scope of the appended claims once the principles of the invention are understood.

What is claimed is:

1. An automated method of producing patterns of cut openings or recesses in a stencil by means of a digital computer having electronic data storage means, said method comprising the following steps:

providing a graphic representation of the pattern to be reproduced, designating lines present in the graphic information as straight or curved line segments having their ends (a) touching or (b) adjacent but spaced apart from one another, each curved segment being an arc with a curvature corresponding to the curvature of a line or portion of a line in the original graphic representation of the pattern, converting each of the line segments to digital form by defining each of the straight segments by two points and curved segments by at least three points including a beginning point, an ending point and an intermediate point all located on the curved line segment, storing the said points by representing coordinates of said points in retrievable form in said electronic data storage means, converting the stored digital information into digital form adapted to actuate a cutting means for producing cut patterns in the stencil sheet, and energizing the cutting means to cut a pattern in the sheet by inducing relative motion between the cutting means and the stencil sheet along successive lines corresponding to the stored digital information defined by the coordinates of each of the points corresponding to line segments containing the points and de-energizing the cutting means at positions located between adjacent spaced apart segments to define connecting ligaments in the stencil sheet between said adjacent segments to thereby produce a pattern of linear recesses or openings in the stencil sheet corresponding to the original graphic representation of the pattern.

2. The automated method of claim 1 wherein each of the curved segments of preestablished curvature is an arc of a circle having a center point and radius corresponding to the radius of the same curved portion of a line in the original representation of the pattern, and moving the cutter along the arc of successive circles defined by three points including a beginning point, an ending point and an intermediate point all located on the circular arc.

3. The automated method of claim 1 wherein:

a graphic means is provided for exhibiting the stored digital information, the stored information is retrieved from storage and transferred to the graphic display and each of the straight or curved line segments in storage is exhibited on the graphic display for visual verification of the graphic representation.

4. The automated method of claim 1 wherein a manually operable point locating digitizer is provided, the graphic representation of the pattern includes a plurality of lines to be reproduced, establishing the coordinates of said points along said lines making up the pattern starting with the beginning point, next the intermediate point, and finally the end point by actuating the manually operable point locating digitizer at each successive selected point on the lines of the pattern until the axes of all of the points making up the lines of the pattern have been established, and transferring the data thus established from the digitizer to the electronic data storage means.

5. The automated method of claim 4 wherein the curved segments are circular arcs and the cutter is moved in successive circular arcs defined by each set of beginning, intermediate and end points all located on a circular arc.

6. An automated method of producing patterns of cut openings or recesses in sheet material to produce a finished stencil by means of a digital computer having electronic data storage means, said method comprising the steps of:

providing a graphic representation of a pattern to be reproduced including a plurality of lines, providing a manually operable point locating digitizer, actuating the digitizer at selected locations along the lines making up the pattern to be reproduced, designating lines present in the graphic information as straight or curved line segments having their ends touching or adjacent to one another wherein each curved segment is an arc of a circle having a selected radius corresponding to the radius of the same portion of a line in the representation of the pattern, establishing the coordinates of the points along the circular arcs starting with a beginning point, next an intermediate point and finally an end point by actuating the manually operable point locating digitizer at each successive selected point on the lines of the pattern until the coordinates making up the lines of the pattern have been established, storing the coordinates for each of the three points by placing the coordinates for each of the three points of each circular line segment in retrievable form in said electronic data storage means, providing graphic display means for exhibiting the stored digital information, retrieving stored information and transferring the stored information to the graphic display for visual verification of the graphic representation, thereafter converting the stored digital information into digital form adapted to actuate a cutting means for producing patterns on a stencil sheet and energizing the cutting means to cut a pattern in a sheet by inducing relative motion between the cutting means and the stencil sheet along successive circular arcs corresponding to the stored digital information defined by the coordinates of each of the three points of each curved segment, de-energizing the cutting means at positions located between the adjacent spaced apart segments to define connecting ligaments in the stencil sheet between them to thereby produce a pattern of recesses or openings corresponding to the original graphic representation of the pattern.

7. The automated method of claim 6 wherein program control means is provided to determine whether the three points making up each line segment define a circle of very large radius whereupon the points contained therein are changed so that only the beginning and ending point is designated and said line is further designated for storage with a symbol indicating such line to be a straight line rather than a circular arc.

8. The automated method of claim 6 wherein program control means is provided for producing points representing mirror images of one-half of any design with bilateral or radial symmetry located on one side of a center line extending through the center of the pattern and said program control adapted to produce the mirror image is actuated to establish and store points located on the opposite side of said center line by an equal distance for each of the entered points located on one side of said center line.

9. The automated method of claim 6 wherein program control means is provided for adding a selected value to the coordinates of the stored points as required to give all stored points a positive value and the program control is actuated when required to eliminate negative values from the stored coordinates.

10. The automated method of claim 6 wherein circle program control means is provided for calculating the center point of a circular arc containing said three points and using said circle program control to define a circle of which the arc containing the set of three points is a portion and controlling the operation of the stencil cutting means by moving the cutting means from the beginning point in the direction of the intermediate point along said circle to the ending point and stopping at the ending point.

11. The automated method of claim 6 wherein the cutting means includes a laser cutting head and starting the laser at each of the beginning points and terminating the laser operation at each of the ending points of each successive arc or straight line.

12. The automated method of claim 6 wherein the cutting means includes a high-speed drill having a bit adapted to cut slots in a stencil sheet and the drill is lowered into contact with the stencil sheet at each of the beginning points and withdrawn from the sheet at each of the ending points to thereby reproduce the pattern on the stencil sheet.

* * * * *